US012006864B2

(12) United States Patent
Klassen et al.

(10) Patent No.: US 12,006,864 B2
(45) Date of Patent: Jun. 11, 2024

(54) ENERGY TRANSFER MACHINE

(71) Applicant: 1159718 B.C. Ltd., Surrey (CA)

(72) Inventors: James Brent Klassen, Osoyoos (CA); Javier Peter Fernandez-Han, Burnaby (CA)

(73) Assignee: 1159718 B.C. Ltd., Surrey (CA)

( * ) Notice: Subject to any disclaimer, the term of this patent is extended or adjusted under 35 U.S.C. 154(b) by 0 days.

(21) Appl. No.: 18/469,235

(22) Filed: Sep. 18, 2023

(65) Prior Publication Data

US 2024/0003290 A1 Jan. 4, 2024

Related U.S. Application Data

(63) Continuation of application No. 18/163,817, filed on Feb. 2, 2023, now Pat. No. 11,761,377.

(60) Provisional application No. 63/352,545, filed on Jun. 15, 2022, provisional application No. 63/306,077, filed on Feb. 2, 2022.

(51) Int. Cl.

| | |
|---|---|
| ***F02B 55/14*** | (2006.01) |
| ***F02B 43/10*** | (2006.01) |
| ***F02B 47/02*** | (2006.01) |
| ***F02B 53/12*** | (2006.01) |

(52) U.S. Cl.

CPC .............. *F02B 55/14* (2013.01); *F02B 43/10* (2013.01); *F02B 47/02* (2013.01); *F02B 53/12* (2013.01)

(58) Field of Classification Search

CPC .......... F02B 55/14; F02B 43/10; F02B 47/02; F02B 53/12

See application file for complete search history.

(56) References Cited

U.S. PATENT DOCUMENTS

| | | | |
|---|---|---|---|
| 3,810,721 A | 5/1974 | Eyer | |
| 3,970,049 A * | 7/1976 | Yamaguchi | F02B 53/12 123/211 |
| 4,137,891 A | 2/1979 | Dalrymple | |
| 4,316,439 A | 2/1982 | Tyree | |
| 6,273,695 B1 | 8/2001 | Arbogast et al. | |
| 6,932,047 B2 | 8/2005 | Watkins et al. | |
| 6,968,825 B2 | 11/2005 | Hitomi et al. | |
| 7,111,606 B2 | 9/2006 | Klassen | |
| 7,503,307 B2 | 3/2009 | Klassen et al. | |
| 7,954,470 B2 | 6/2011 | Klassen et al. | |
| 9,309,812 B2 * | 4/2016 | Ikeda | F02P 3/01 |
| 9,670,924 B2 | 6/2017 | Holtzapple et al. | |

(Continued)

FOREIGN PATENT DOCUMENTS

| | | |
|---|---|---|
| CA | 2 440 304 C | 8/2002 |
| CA | 3 133 616 A1 | 9/2019 |

(Continued)

*Primary Examiner* — George C Jin

(74) *Attorney, Agent, or Firm* — Seed IP Law Group LLP

(57) ABSTRACT

An energy transfer machine includes a piston and cylinder. The piston can have a rocking motion as it enters and exits the cylinder, for example due to one being on a rotor and the other on a stator. The piston and cylinder form a primary chamber, and as they move relative to each other can form a seal separating the primary chamber into first and second sub-chambers which then unseals before the piston exits the cylinder. The first sub-chamber may reach a maximum geometric compression ratio, for example for the purpose of compression ignition, before the unsealing of the sub-chambers.

8 Claims, 25 Drawing Sheets

(56) References Cited

U.S. PATENT DOCUMENTS

| | | | | |
|---|---|---|---|---|
| 9,863,372 | B2 | 1/2018 | Fujimoto et al. | |
| 9,932,883 | B2 | 4/2018 | Iwai et al. | |
| 11,549,507 | B2 | 1/2023 | Klassen et al. | |
| 2004/0009085 | A1 | 1/2004 | Lamparski et al. | |
| 2007/0084434 | A1 | 4/2007 | Leon | |
| 2007/0220873 | A1* | 9/2007 | Bosteels | F01N 3/10<br>60/299 |
| 2007/0251491 | A1 | 11/2007 | Klassen et al. | |
| 2010/0122685 | A1 | 5/2010 | Oledzki | |
| 2010/0139612 | A1 | 6/2010 | Manganaro | |
| 2015/0260092 | A1* | 9/2015 | Epman | F01C 1/063<br>123/200 |
| 2019/0093551 | A1* | 3/2019 | Roberts | F02B 53/12 |

FOREIGN PATENT DOCUMENTS

| | | |
|---|---|---|
| DE | 41 043 97 | 9/1991 |
| EP | 0 661 454 | 7/1995 |
| WO | 86/06787 A1 | 11/1986 |

* cited by examiner

ENERGY TRANSFER MACHINE

TECHNICAL FIELD

Rotary piston machines.

BACKGROUND

To meet the demand for clean powered passenger vehicles, hydrogen combustion engines offer an alternative to conventional powerplant solutions and have a unique combination of advantages. Applying hydrogen combustion to an IC engine has its own challenges which include lower power density, limited filling station infrastructure (this problem can be made worse by the reduced range of some hydrogen vehicles), and the possibility of high NOx emissions with conventional spark ignition.

Homogeneous Charge Compression Ignition (HCCI) addresses the main challenges of hydrogen combustion. It provides higher efficiency for greater range, and can have low NOx due to the possibility of lower combustion temperatures.

An engine with multi-fuel operation would have the advantage of compatibility with multiple existing fuel infrastructures, enabling use in a greater number of markets. For example, this could permit primarily low-emissions operation while combusting hydrogen for the majority of consumers who usually do not need long distance capabilities, while providing the option to combust other fuels when longer range capability is desired. There may also be advantages to burning multiple fuels at the same time. Such vehicles could be compatible with existing filling station operation of gasoline or diesel for extended range back-up operation, or during trips in areas which do not have availability of the primary fuel.

However, HCCI also introduces challenges. Although HCCI combustion may be more efficient and clean-burning than conventional spark-ignited combustion methods, it may result in lower power density when burning lean hydrogen. Also, HCCI combustion is difficult to achieve consistently over a wide range of operating conditions. This is because transient engine conditions make it difficult to consistently achieve an optimal pressure in the cylinder at precisely the right time.

SUMMARY

The inventor discloses a novel rotary positive displacement energy transfer machine comprising an inner rotor having outward-facing projections, also called feet, which mesh with inward-facing projections located on an outer rotor which addresses these challenges.

The inventor addresses the aforementioned challenge of consistently controlling ignition events via two approaches. The first approach is to cause the primary chamber to split into two or more discrete sub-chambers, each with a respective discrete compression ratio, at a predetermined crank angle. This approach can take advantage of the unique 'Rocking Piston' geometry of embodiments of the machine. The split allows a small first sub-chamber (also referred to, here, as a pre-compression chamber) to compress beyond the denotation pressure/temperature just before the first sub-chamber minimum volume crank angle. This sub-chamber then unseals to the rest of the primary chamber, for example due to the rocking motion of the piston. This increases the pressure in the primary chamber and causes compression-ignition of the remainder of the hydrogen. The pre-compression chamber, combined with the rocking piston and high engine speed ensure that the maximum pressure, after ignition will happen within a tightly controlled predetermined crank angle range from the first sub-chamber minimum volume crank angle. The splitting into discrete sub chambers may occur between the sealing and unsealing of the primary chamber, or in an embodiment at the same time as the sealing of the primary chamber. The rocking piston can allow the unsealing of the sub-chambers to happen near the moment when the second sub-chamber is at its highest compression ratio (minimum volume), for example so that the difference between the volume at the unsealing crank angle and the minimum volume is less than 10%, 20%, 30%, 40%, 50% or 60% of the difference between the volume at the sub-chamber sealing crank angle and the minimum volume.

Another beneficial effect of embodiments of the machine is that compression occurs over a small engine shaft/carrier angle relative to the crank angle required in a conventional reciprocating piston engine, thereby increasing the precision of the timing of the combustion. This reduces the window of time in which combustion is likely to commence. In some embodiments the machine has a combination of a high engine shaft/carrier speed and high speed of compression due to the small engine shaft/carrier angle change required for a compression cycle, which results in a compression cycle that may be up to or more than ten times faster than a typical piston engine.

A typical four stroke HCCI piston engine may require the combustion chamber gas to reach ignition temperature, for example, within no more than 0.5 milliseconds before Top Dead Center (TDC). Consequently, a conventional engine may need to be engineered such that ignition occurs within a crank angle window of a few degrees from TDC.

Conversely, because in some embodiments the inventor's machine's compression cycle takes fewer degrees of input shaft rotation and thus less time for a given engine output shaft rotational speed, the moment of combustion is easier to control. This allows for precise timing of the beginning and end of the window in which compression ignition can occur, and specifically to ensure that compression ignition does not happen in the primary chamber before the piston (AKA foot) reaches the first sub-chamber unsealing crank angle. In a non-limiting embodiment an air-fuel mixture is present in both of the first sub-chamber and the second sub-chamber at the first sub-chamber sealing crank angle. If compression ignition were to occur in the first sub-chamber before or after the ideal point in the first sub-chamber's compression stroke, the air/fuel mixture in the primary chamber would still ignite as long as the first sub-chamber combusts at some point in the window between the first sub-chamber sealing crank angle and the first sub-chamber unsealing crank angle.

The inventor anticipates, therefore, that the HCCI cycle would be easier to implement in embodiments of the machine disclosed, compared to a conventional piston internal combustion engine, because embodiments provide that compression ignition is less likely to happen before or after the desired range of crank angles which are defined by the angles between the sealing angle of the first sub-chamber and the un-sealing angle of the first sub-chamber.

This characteristic, alone, may be enough to ensure that ignition pressures can only happen within the desired angle before the first sub-chamber minimum volume crank angle. Other unique features of certain embodiments using this approach include a geometry that eliminates the need for a close tolerance carrier with the expected benefits of increased pressure and efficiency, as well as lower manufacturing cost. The inventor also discloses a second approach whereby a mechanically timed proximity spark ignition configuration which allows the use of spark ignition as a backup for cold conditions and which will allow operation with multiple fuels, even simultaneously.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Disclosed are designs and methods for designing and constructing a rotary motion device. The device, in various embodiments, bears certain similarities to conventional positive displacement pumps and internal combustion engines. The disclosed device also features novel elements, which may make it more particularly suited to use in an internal combustion engine application.

Seals or the act of sealing in this disclosure may, at times, refer to the interaction of parts which are in proximity to one another to a sufficient degree to limit undue flow of a fluid through a gap between the parts. Such seals or sealing may be present when the parts contact or may also be present when the parts are in close physical proximity to one another, but there is no physical contact between the parts. Such interactions may alternatively be referred to as contact or near contact seals.

Figure 1:
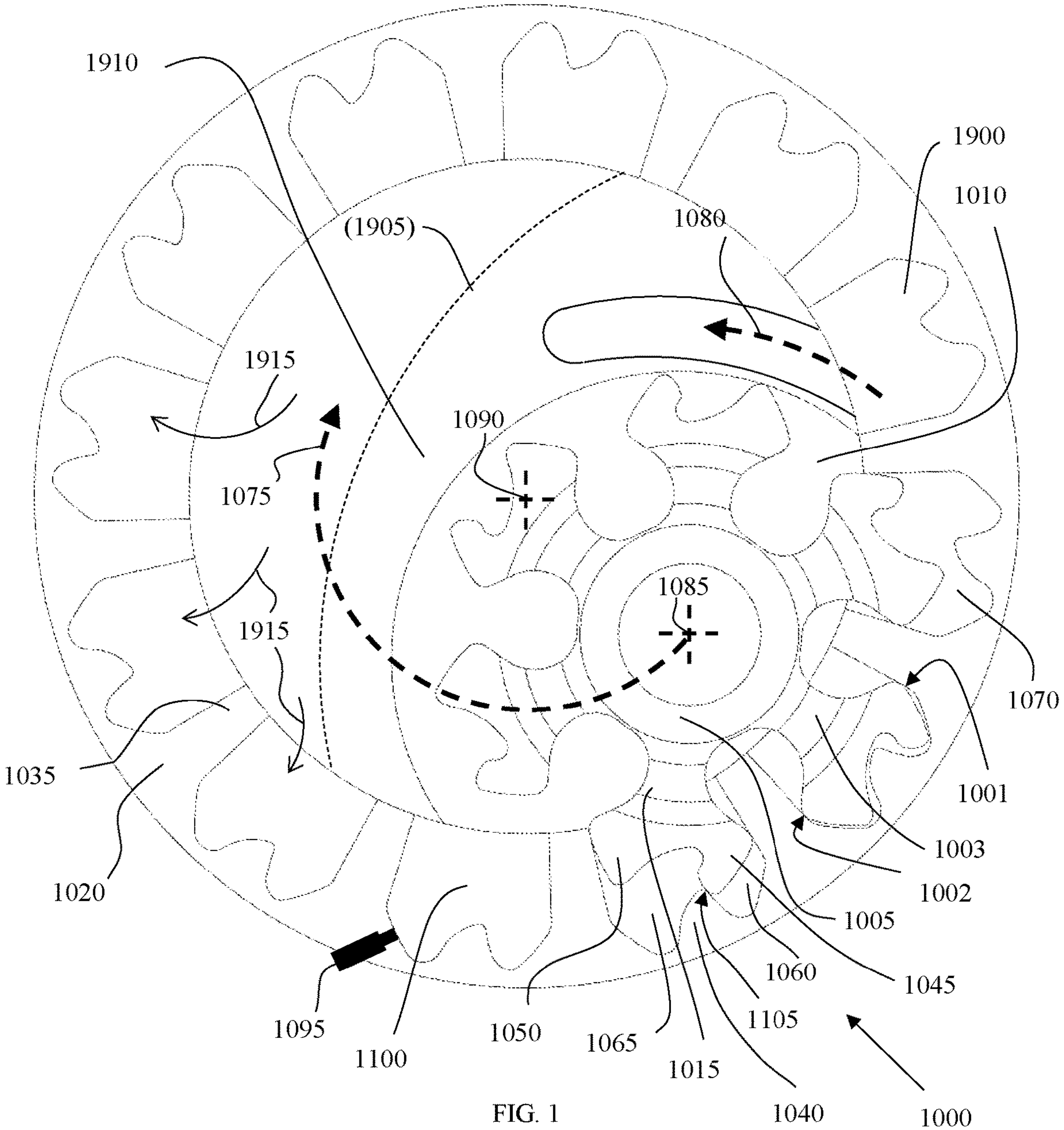
FIG. 1. is an axial cutaway view of an exemplary energy transfer machine.
Figure 19:
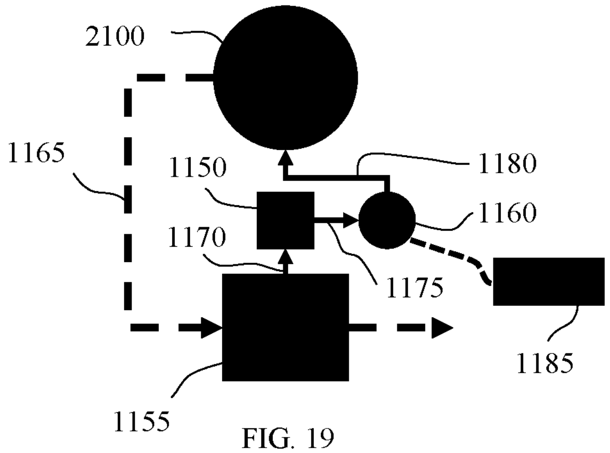
FIG. 19 is a schematic diagram of a system including an engine for example as shown in FIGS. 1-9 or FIGS. 11-17, and a system to extract water from exhaust of the engine and reintroduce the water to the engine.
Figure 21:
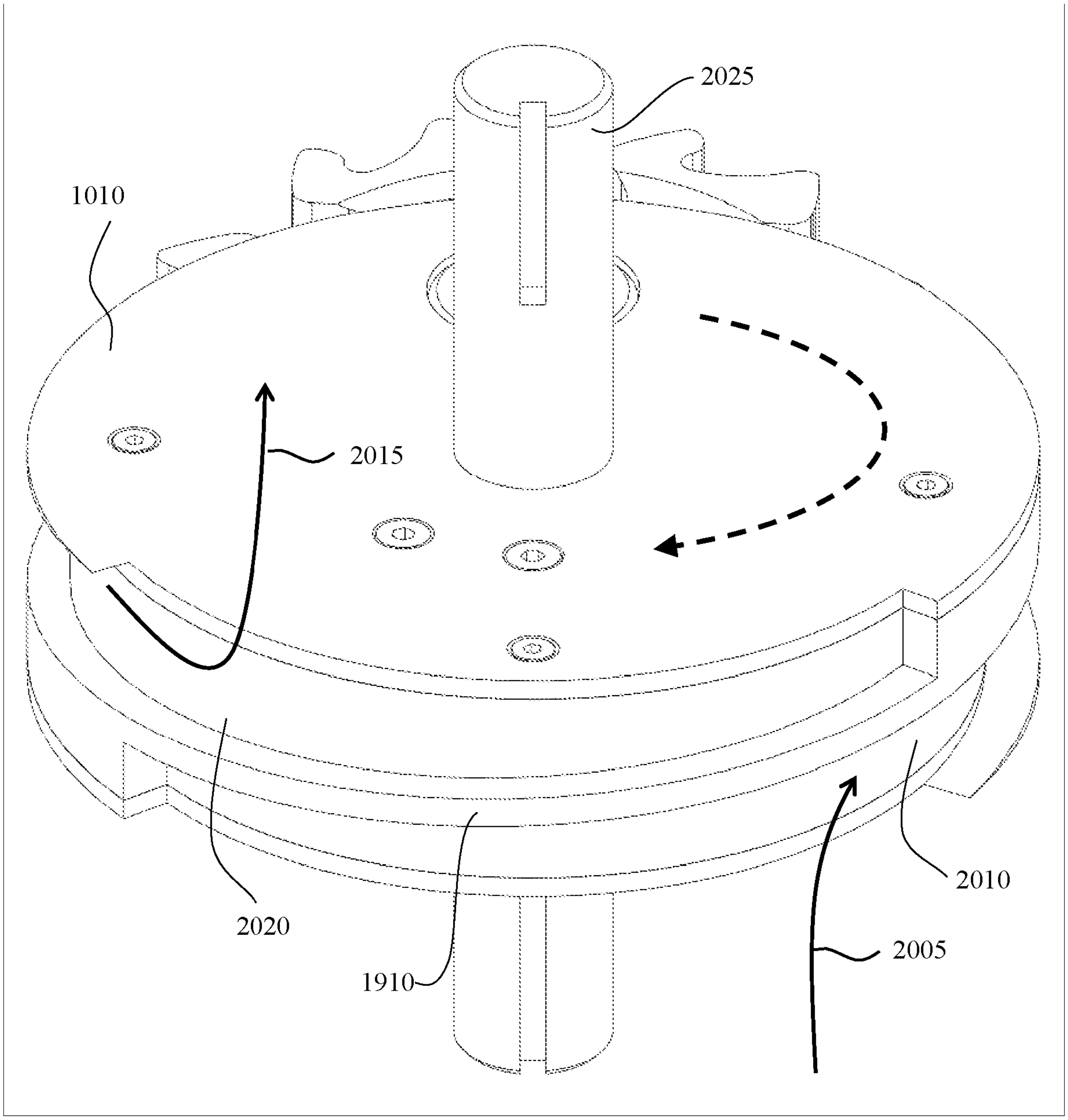
FIG. 21 is an isometric cutaway view of the carrier and an inner rotor of the engine of FIG. 20.
Figure 24:
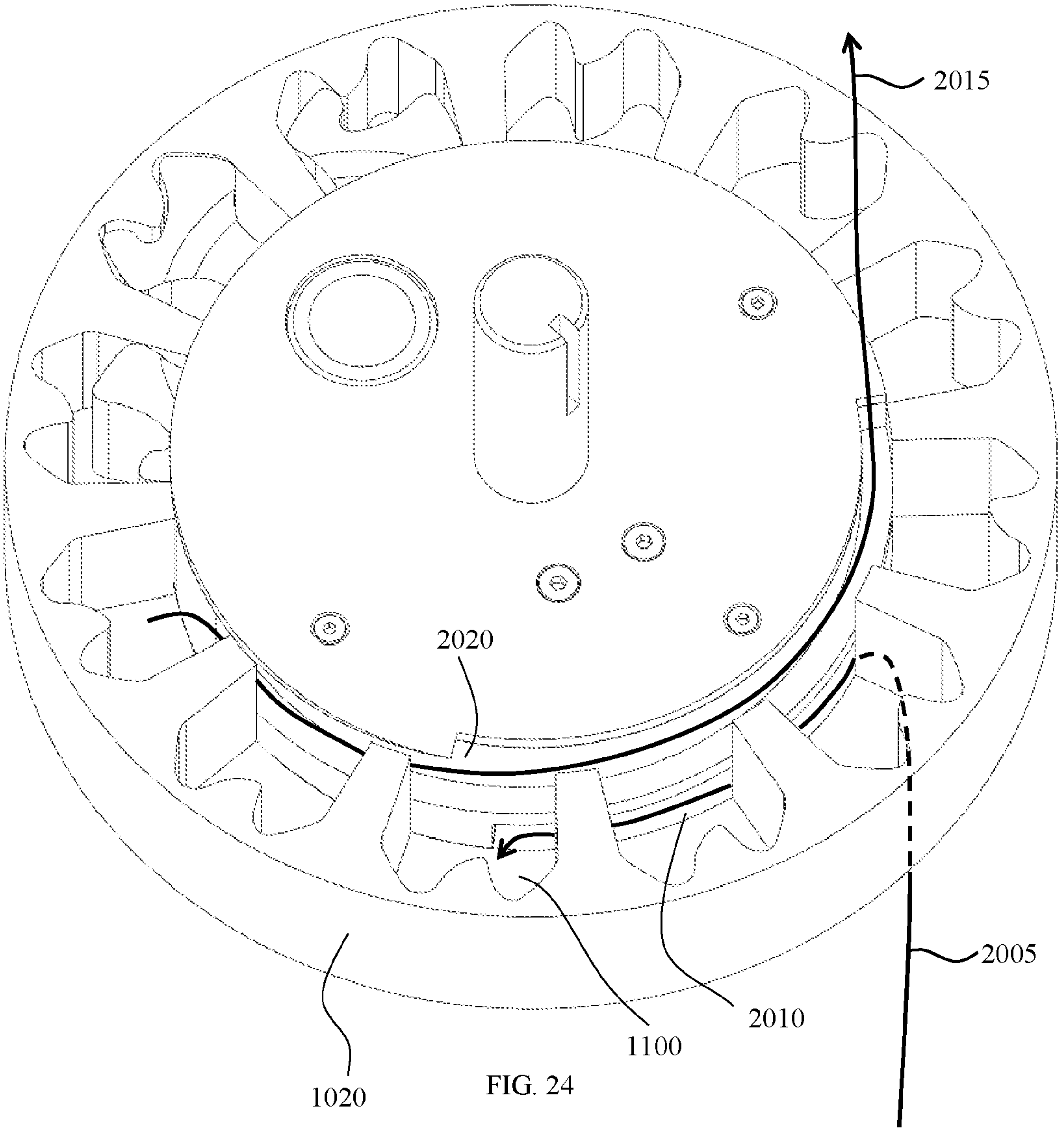
FIG. 24 is an isometric cutaway view of the engine of FIGS. 20-21, showing flow paths for intake air and exhaust.

In a non-limiting embodiment shown in FIG. 1 an energy transfer machine 1000 comprises an outer stator 1020 having a plurality of primary projections 1035 which form in between them a plurality of inward-facing cavities 1100 which are also called chambers, a carrier 1010 mounted within the outer stator 1020 and constrained for rotation about a first axis 1090, such as output shaft 2025 shown in FIG. 19, FIG. 21, and FIG. 24, the aforementioned axis positioned substantially centrally with respect to the inward-facing cavities 1100 of the outer stator 1020, and an inner rotor 1005 having outward-facing projections 1015, also referred to as feet, arranged to mesh with the inward-facing cavities 1100 of the outer stator 1020.

The inner rotor 1005 is mounted to the carrier 1010 and constrained for rotation about a second axis 1085, the second axis 1085 moving with the carrier 1010 and being substantially parallel to, but positioned eccentrically with respect to (i.e. not collinear with) the first axis 1090.

In this way the carrier 1010 may rotate relative to the outer stator 1020 about the first axis 1090, moving the location of the second axis 1085 about the first axis 1090 as it does so. Similarly, the inner rotor 1005 may rotate relative to the carrier 1010 about the second axis 1085. The direction of rotation of the carrier 1010 and the axis 1085 of the inner rotor 1005 is indicated by line 1075 and the direction of rotation of the inner rotor 1005 is indicated by line 1080. The position of the second axis 1085 relative to the first axis 1090 will be referred to throughout this document as the crank angle.

As the crank angle changes, the outward-facing projections 1015 of the inner rotor 1005 and the inward-facing cavities 1100 of the outer stator 1020 are arranged to mesh forming primary chambers 1070 within the inward-facing cavities 1100 of the outer stator 1020. These primary chambers 1070 become sealed and unsealed as leading edges and trailing edges of the inner rotor 1005 outward-facing projections 1015 move into and out of contact or near contact with edges of the inward-facing cavity walls of the outer stator 1020 as the inner rotor 1005 rotates about the second axis 1085 and the carrier 1010 rotates about the first axis 1090. For reference, leading edge 1001 and trailing edge 1002 of inner rotor 1005 foot 1003 are shown in FIG. 1.

Figure 5:
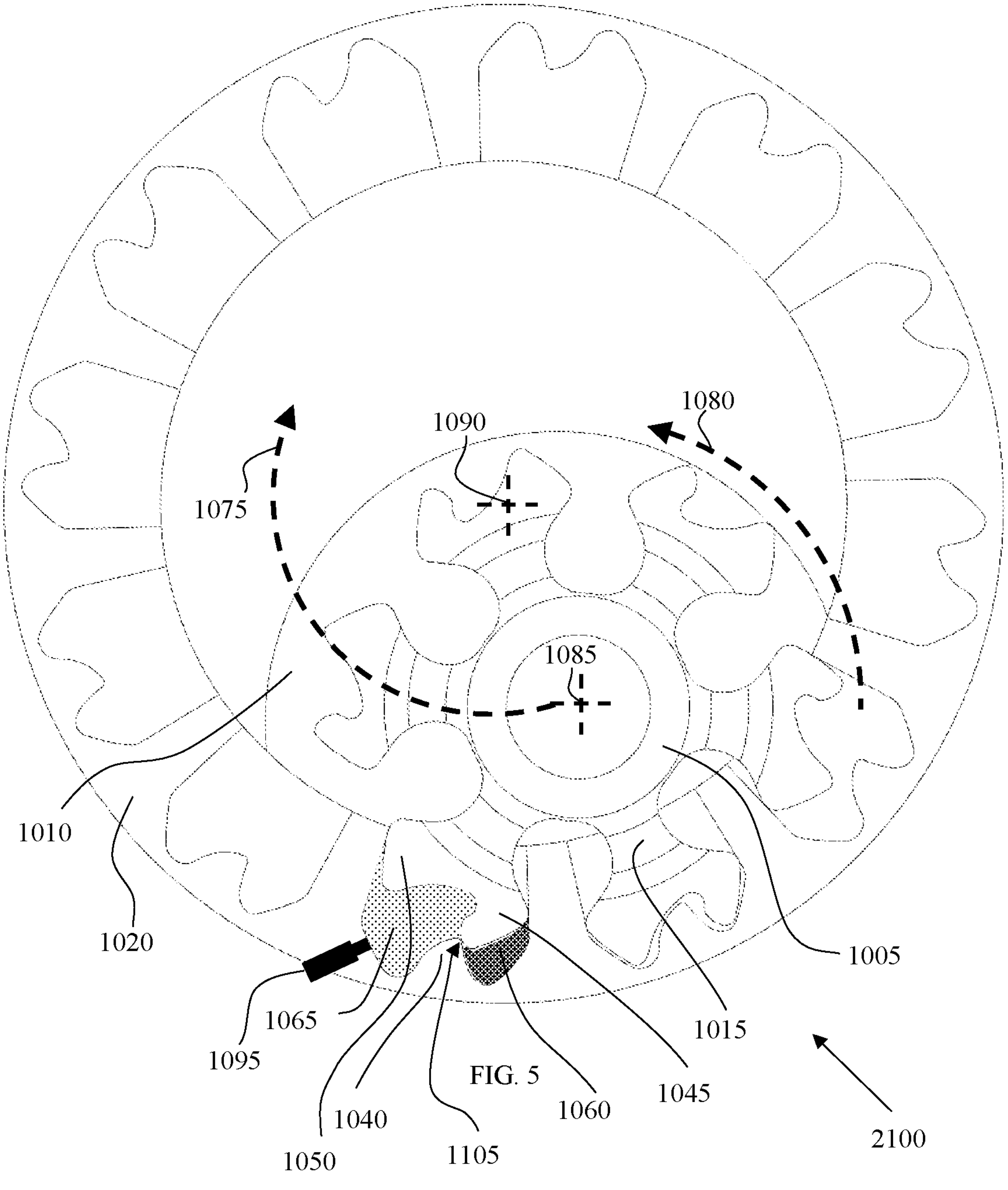
FIG. 5 is an axial cutaway view of the exemplary energy transfer machine at a crank angle advanced relative to FIG. 4.

Additionally, the shape of the outward-facing inner rotor projections and inward-facing outer stator cavities is configured to form, after the sealing of a primary chamber, an additional contact or near-contact seal 1105 extending across the primary chamber 1070, thus dividing the primary chamber 1070 into a first sub-chamber 1060 and second sub-chamber 1065 as seen for example in FIG. 5. In the non-limiting embodiment shown in FIG. 1, the inner rotor foot 1015 has a sub-chamber sealing feature 1045 which seals against a stator sub-chamber sealing feature 1040, shown in FIG. 1 and FIG. 5, forming a first sub-chamber seal 1105 which extends across the primary chamber 1070 in a direction that is into and out of the page i.e., in the axial direction. The contact seal or near-contact seal 1105 unseals at a crank angle before the primary chamber 1070 unseals.

Motion of the outward-facing inner rotor 1005 sub-chamber sealing feature 1045 and inner rotor second projection 1050, shown in FIG. 1 and FIG. 5, within the cavity acts to change the volume of fluid within the primary chamber or, when they are formed, the sub-chambers.

For clarity, the geometric compression ratio of a sub-chamber is defined in this disclosure even when the sub-chamber is not formed, i.e., not sealed from other parts of the primary chamber. When the sub-chamber does not exist, the geometric compression ratio of the sub-chamber is defined by the geometric compression ratio of the primary chamber in which the sub-chamber is formed. When the sub-chamber is sealed from the primary chamber, the geometric compression ratio of the sub-chamber is defined as the geometric compression ratio of the primary chamber prior to the crank angle at which the sub-chamber is formed, multiplied by a further geometric compression ratio of the sub-chamber relative to the crank angle at which the sub-chamber is formed. More specifically:

The geometric compression ratio of the first sub-chamber 1060 is defined, before the sub-chamber sealing crank angle or after the sub-chamber unsealing crank angle, by a primary chamber 1070 geometric compression ratio relative to the sealing crank angle of the primary chamber 1070. Conversely, the first sub-chamber 1060 geometric compression ratio is defined, between the first sub-chamber sealing crank angle and the sub-chamber unsealing crank angle, by the primary chamber geometric compression ratio at the sub-chamber sealing crank angle multiplied by a further geometric compression ratio of the first sub-chamber 1060 relative to the sub-chamber sealing crank angle. Likewise, the geometric compression ratio of the second sub-chamber 1065 is defined, before the first sub-chamber sealing crank angle or after the first sub-chamber unsealing crank angle, by the primary chamber geometric compression ratio. Conversely, the second sub-chamber geometric compression ratio is defined, between the sub-chamber sealing crank angle and the sub-chamber unsealing crank angle, by the primary geometric compression ratio at the sub-chamber sealing crank angle multiplied by a further geometric compression ratio of the second sub-chamber relative to the sub-chamber sealing crank angle.

In the non-limiting embodiment shown in FIG. 1, the geometric compression ratio of the first sub-chamber 1060 reaches a maximum at a first sub-chamber minimum volume crank angle between the sub-chamber sealing crank angle and the unsealing crank angle of the primary chamber 1070.

This first sub-chamber minimum volume crank angle may be configured, for example in the embodiment shown, to occur after the sub-chambers have been sealed and before the sub-chambers have unsealed. Note that since the first sub-chamber geometric compression ratio is defined even outside this region, and the first sub-chamber minimum volume crank angle is defined in terms of the first sub-chamber geometric compression ratio, the first sub-chamber minimum volume crank angle could also occur outside this crank angle region, for example in a case where the sub-chambers were to unseal before the peak first sub-chamber compression ratio.

It must also be noted that, although it is not the case in the non-limiting embodiment of FIG. 1, the first sub-chamber minimum volume crank angle may be the exact same crank angle as the first sub-chamber unsealing crank angle. In other embodiments, the first sub-chamber minimum volume crank angle may occur before the first sub-chamber unsealing crank angle for a given primary chamber.

In some embodiments, for example including the embodiment shown in FIG. 1, the maximum of the first sub-chamber geometric compression ratio may be higher than a maximum of the second sub-chamber geometric compression ratio. This may be useful for example to enable compression ignition in the first sub-chamber while avoiding compression ignition in the second sub-chamber. In some non-limiting embodiments, the second sub-chamber is designed to also achieve a geometric compression ratio high enough to achieve compression ignition, with the first sub-chamber and second sub-chamber both achieving compression ignition in succession. The inventor anticipates that such a device could be designed to have more than two sub-chambers, each with a different minimum volume crank angle, with each sub-chamber designed to achieve a geometric compression ratio sufficient to achieve compression ignition. In the claims, the mention of first and second sub-chambers does not exclude the presence of further sub-chambers, and the mention of sub-chamber sealing and unsealing crank angles does not exclude additional sealing or unsealing crank angles for further sub-chambers. Further sub-chambers may seal and unseal at the same time as the sub-chamber sealing and unsealing time as between the first and second sub-chambers, or may seal and/or unseal from one or more of the first and second sub-chambers at different times than the sub-chamber sealing and/or unsealing times as between the first and second sub-chambers.

In any of the embodiments described previously, the primary chamber may be designed to seal at a crank angle when the volume of the primary chamber is less than a volume of the primary chamber at a crank angle at which the primary chamber unseals.

Figure 4:
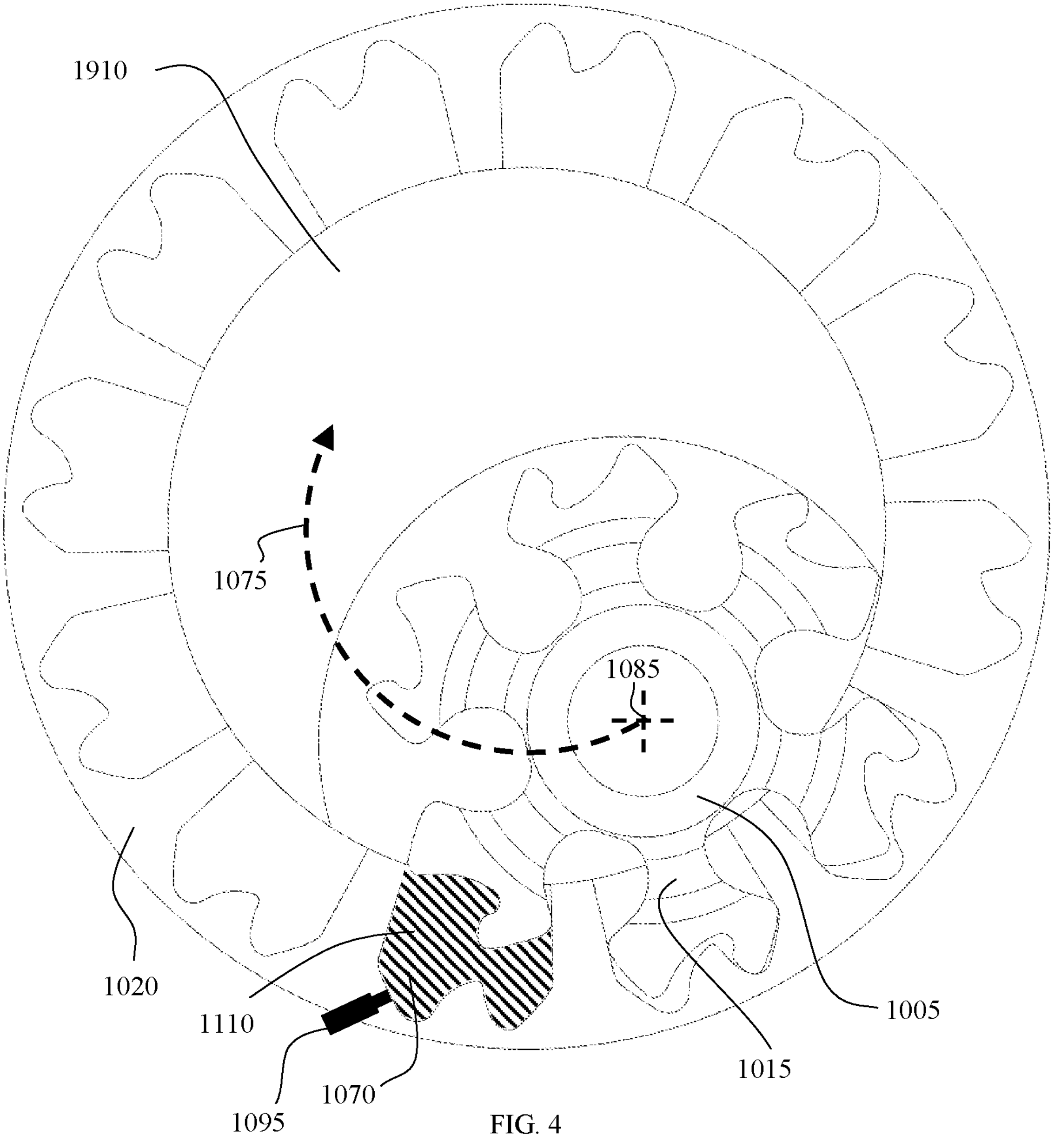
FIG. 4. is an axial cutaway view of the exemplary energy transfer machine at a crank angle advanced relative to FIG. 3.
Figure 7A:
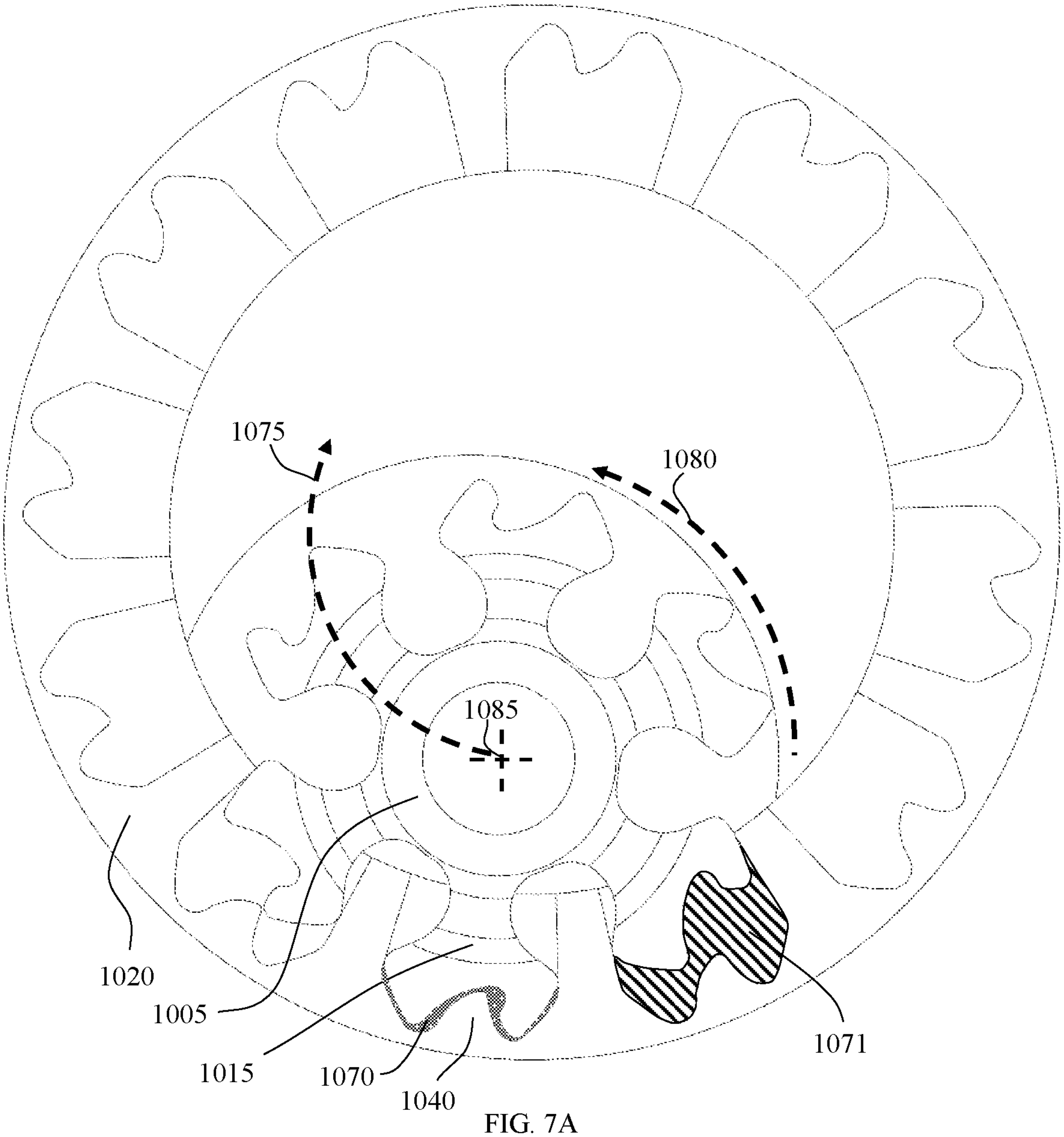
FIG. 7A is an axial cutaway view of the exemplary energy transfer machine at a crank angle advanced relative to FIG. 6.
Figure 7B:
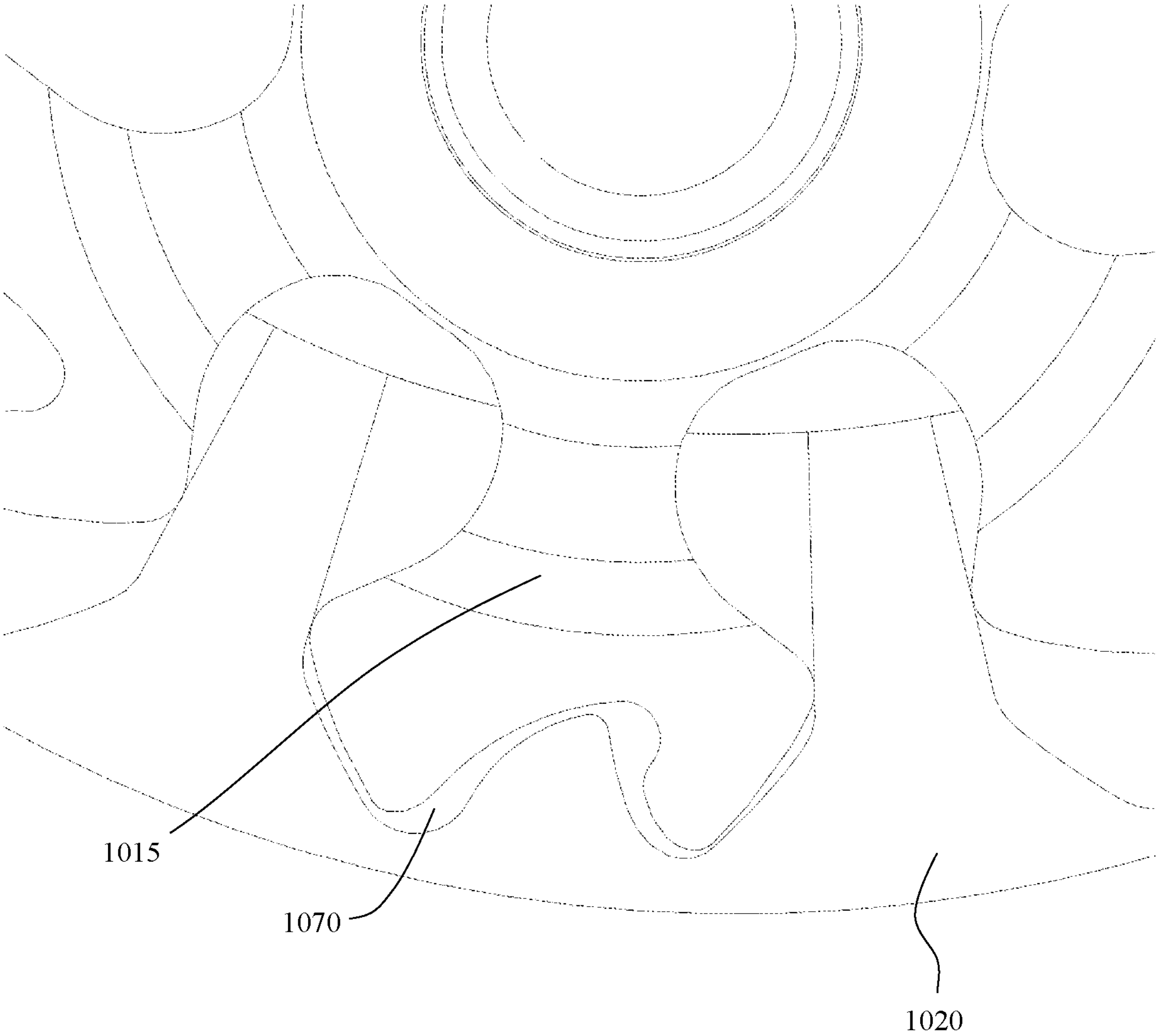
FIG. 7B is a closeup of a projection and chamber of FIG. 7A.
Figure 8:
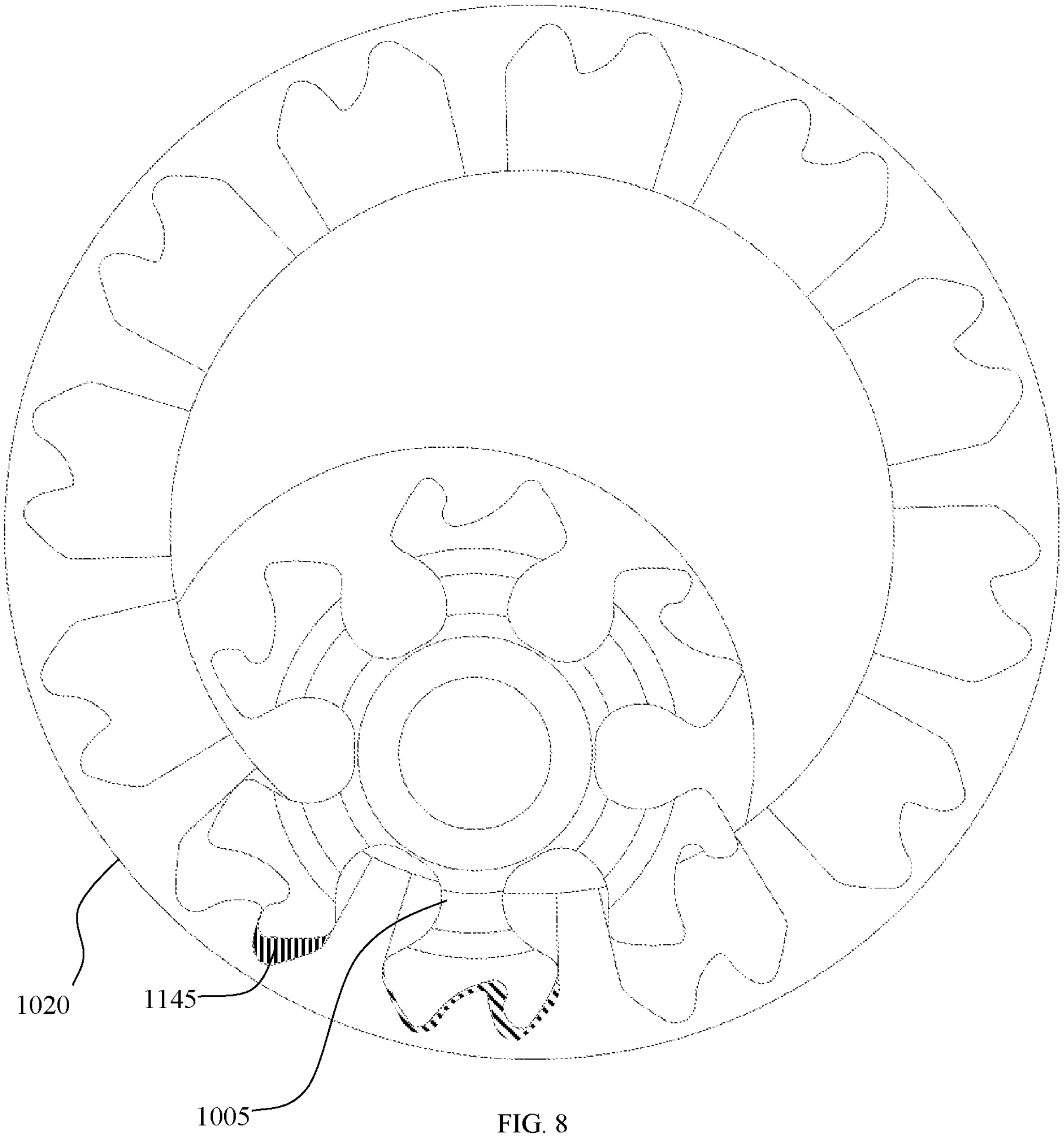
FIG. 8 is an axial cutaway view of the exemplary energy transfer machine at a crank angle advanced relative to FIG. 7A.
Figure 9:
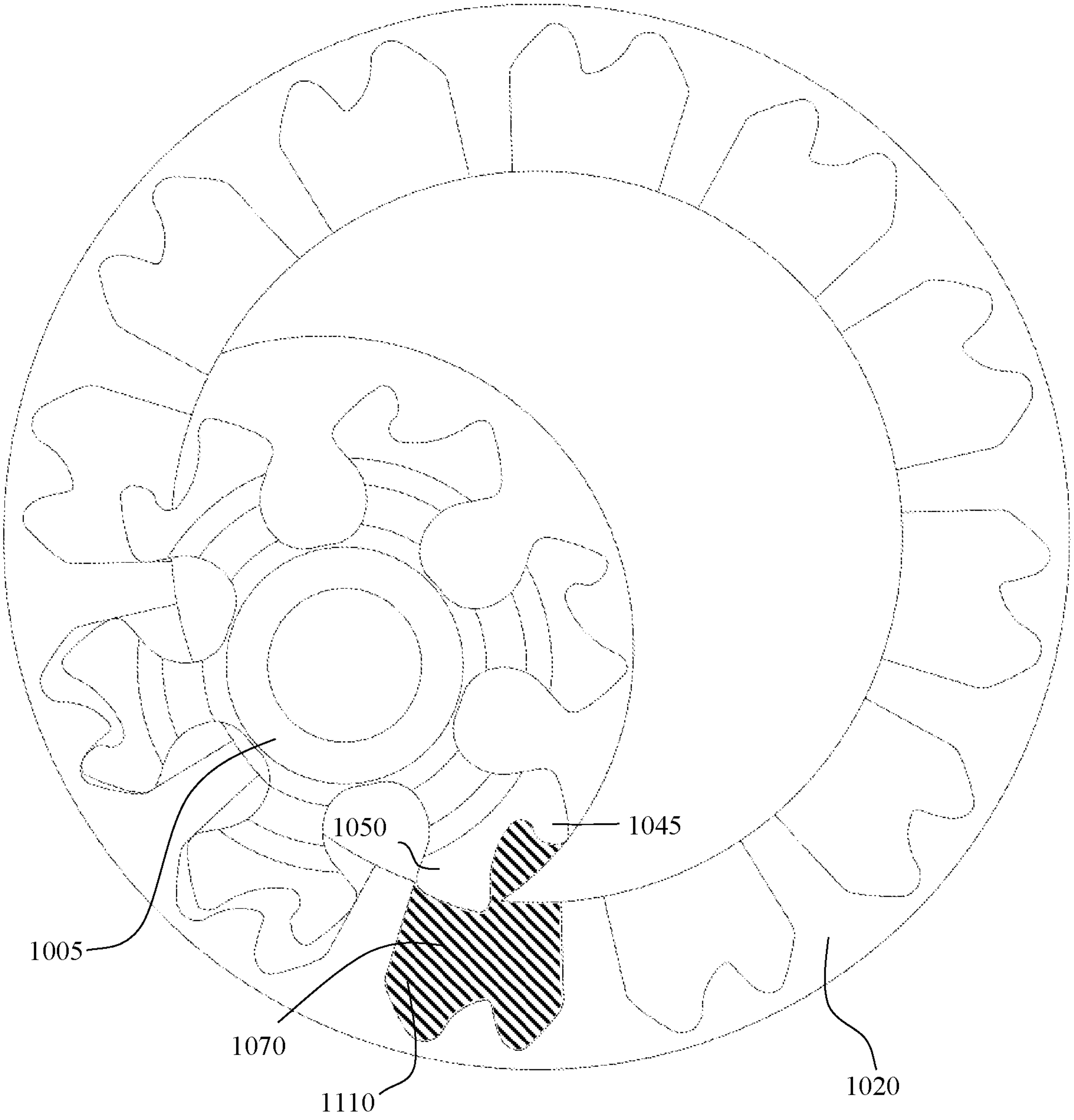
FIG. 9 is an axial cutaway view of the exemplary energy transfer machine at a crank angle advanced relative to FIG. 8.
Figure 10:
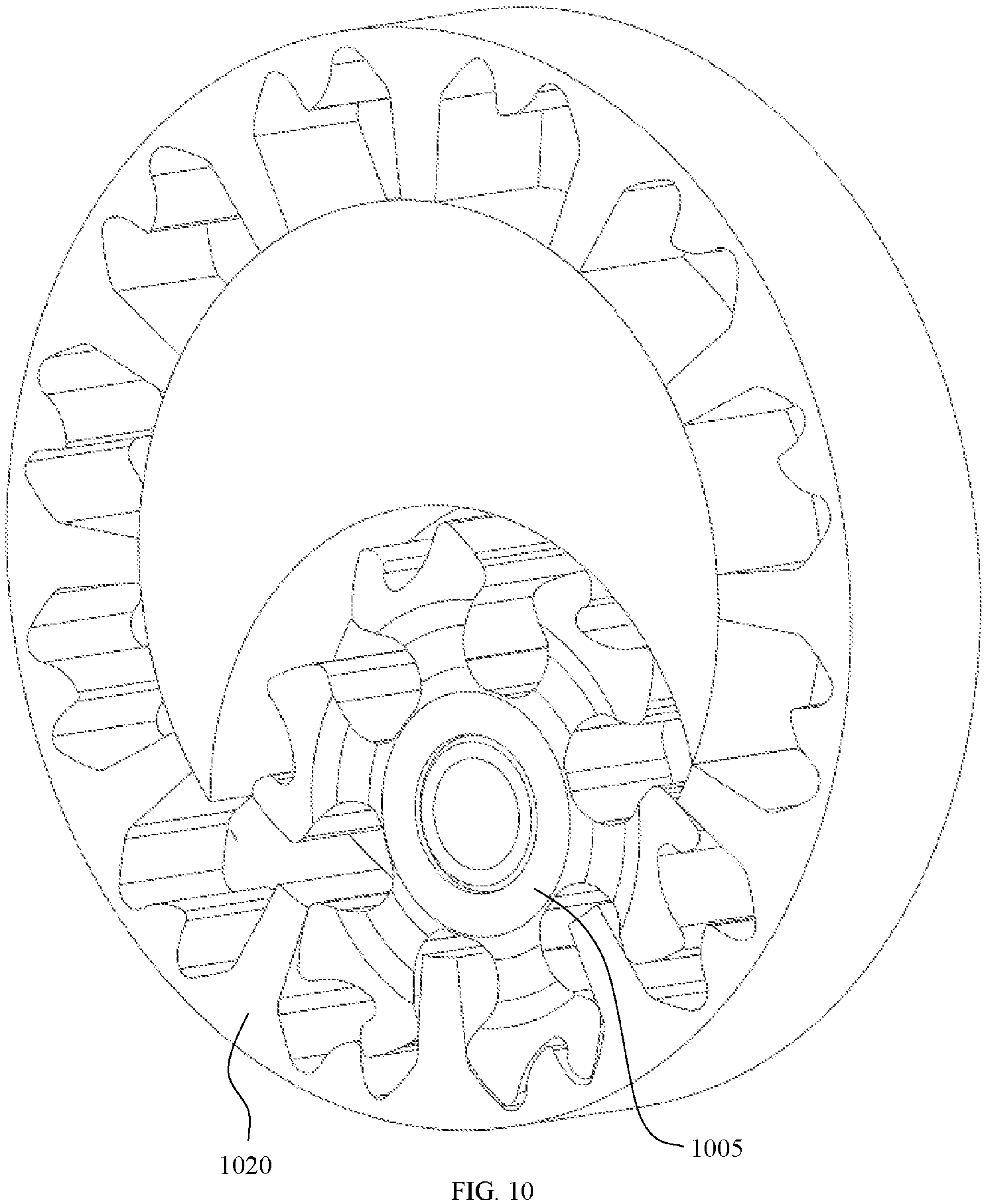
FIG. 10 is an isometric cutaway view of the exemplary energy transfer machine of FIGS. 1-9.

In the non-limiting embodiment shown in FIG. 4 through FIG. 10, the volume of the primary chamber 1070 when the primary chamber seals, the sealed volume 1110 shown by dashed lines in FIG. 4, is less than the volume of the primary chamber when it unseals. The volume of the primary chamber when it reaches its maximum volume and is about to unseal is shown in FIG. 9. Thus, when used in an internal combustion application with the compression stage beginning when the primary chamber 1070 seals as shown in FIG. 4, and the expansion stage ends when the primary chamber unseals, as shown in FIG. 9, the primary chamber has a larger maximum volume during the expansion stage than the compression stage. This enables a cycle comparable to an Atkinson cycle which may result in more efficient operation. The Atkinson cycle has the potential for proportionally greater energy capture during the expansion stage as compared to a cycle with equal compression and expansion volumes.

In any of the embodiments described previously, the second sub-chamber geometric compression ratio may reach a maximum at a crank angle occurring after the sub-chamber unsealing crank angle and before the unsealing crank angle of the primary chamber. At the crank angle just before the first sub-chamber unseals, the second sub-chamber compression ratio is lower than the first sub-chamber compression ratio.

In another non-limiting embodiment, the second sub-chamber geometric compression ratio reaches a maximum at a crank angle occurring before the first sub-chamber unsealing crank angle.

The machine may be configured, for example in internal combustion applications, such that fuel is injected into the primary chamber during, or prior to a compression stroke, and ignition occurs within the first sub-chamber after sealing occurs between the first sub-chamber and primary chamber/second sub-chamber, during full compression of the second sub-chamber, but before the first sub-chamber unsealing crank angle. After the first sub-chamber unseals, a high pressure wave, resulting from ignition of fuel within the first sub-chamber, propagates to the primary chamber resulting in ignition of the air-fuel mixture in the primary chamber as a result of the flame front and/or pressurization from the high pressure gas that is released from the first sub-chamber.

Figure 11:
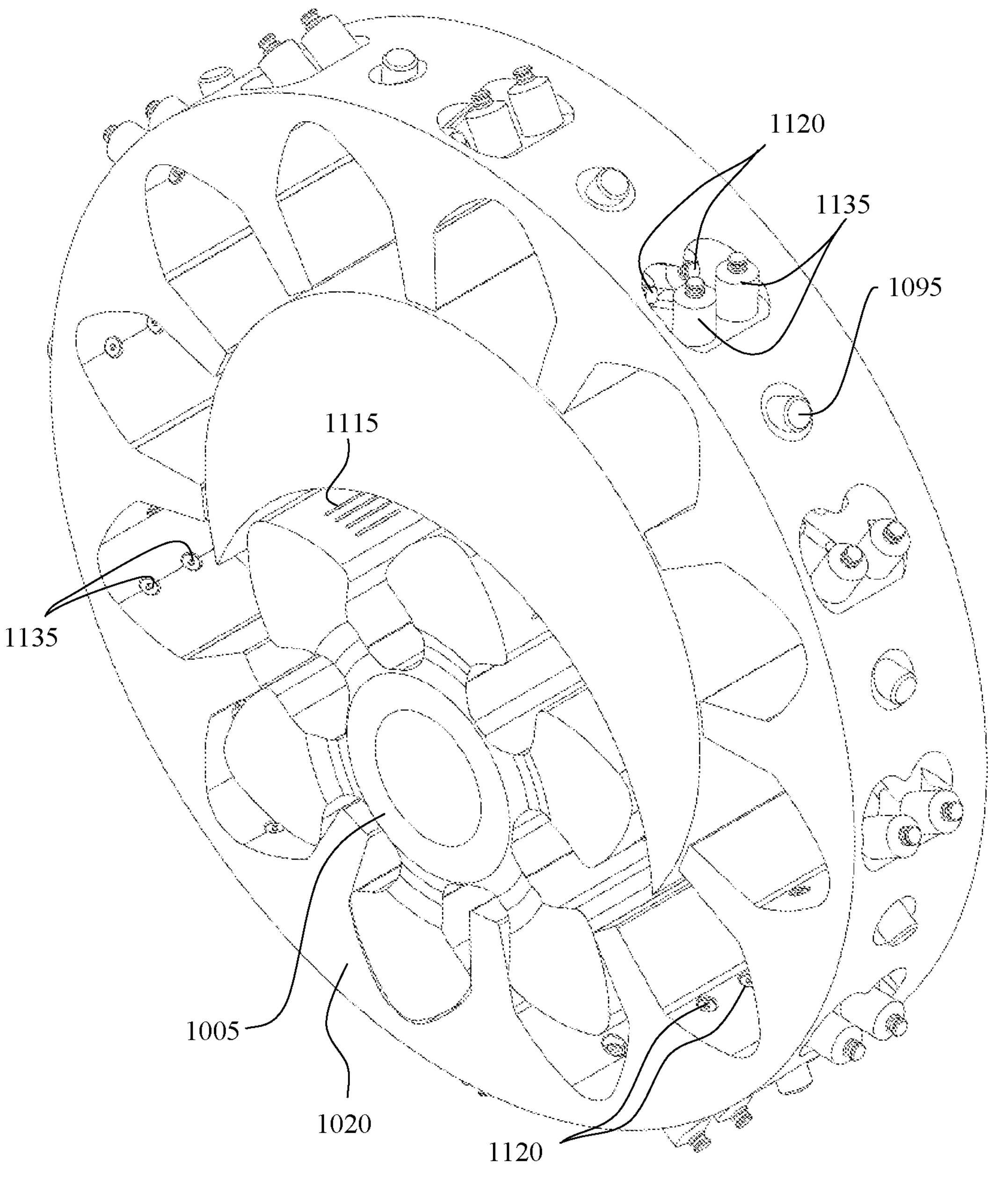
FIG. 11 is an isometric cutaway view of an exemplary engine including electrodes that activate based on proximity to conductors in another part of the engine.
Figure 12:
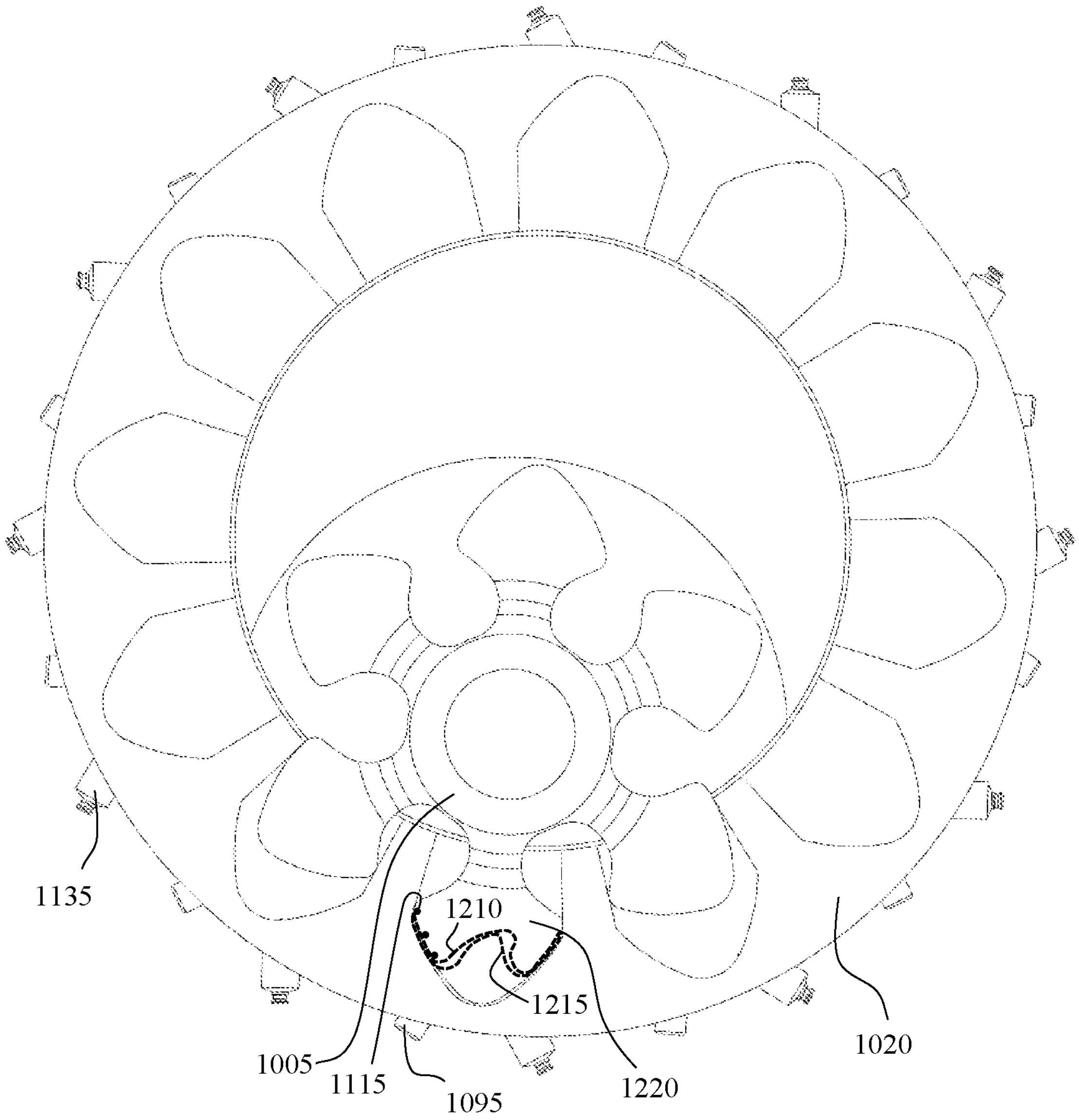
FIG. 12 is an axial cutaway view of the exemplary engine of FIG. 11.
Figure 13:
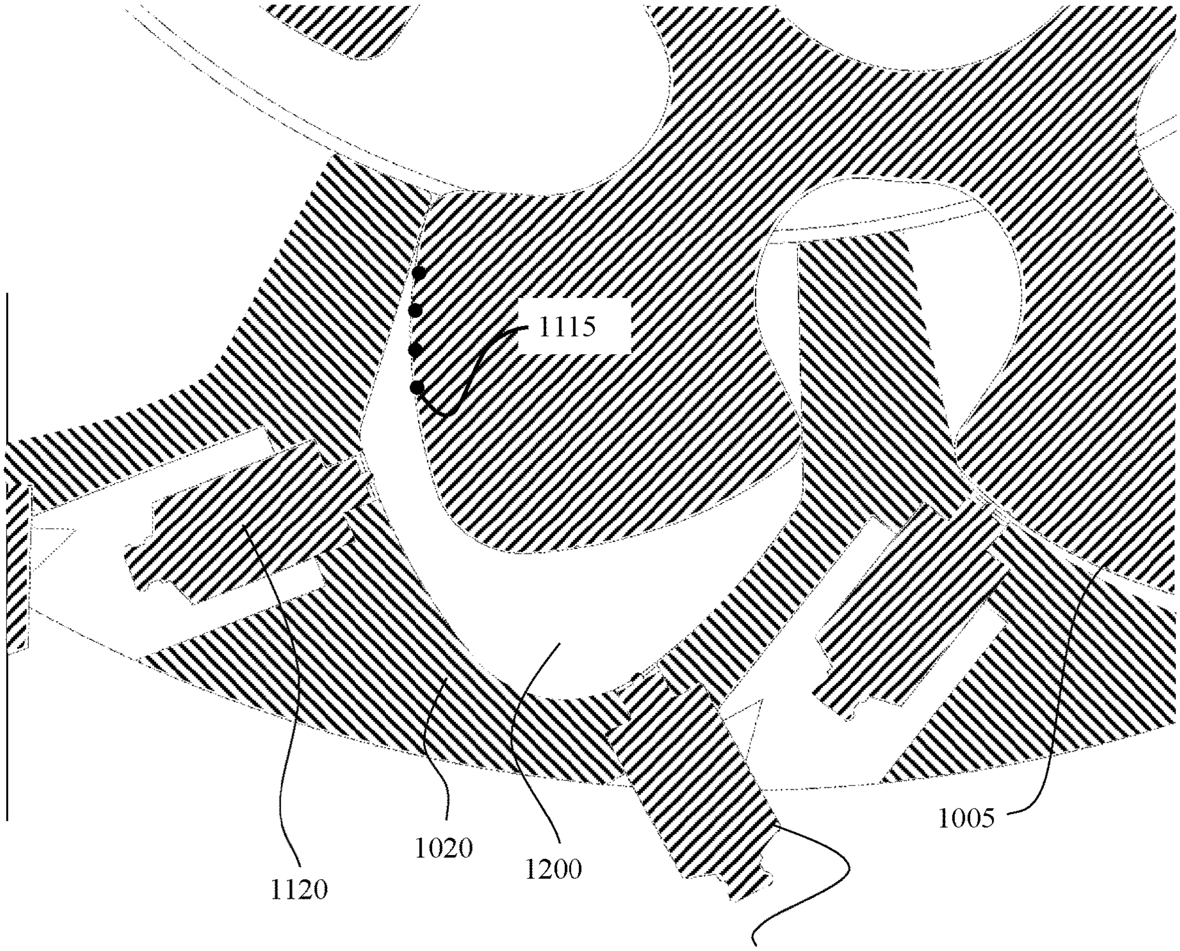
FIG. 13 is a closeup cross-section view of a cylinder and piston of the engine of FIGS. 11 and 12.

In a non-limiting embodiment, the maximum of the first sub-chamber geometric compression ratio is sufficient to cause compression ignition under certain conditions and the maximum of the second sub-chamber geometric compression ratio is not sufficient to cause compression ignition. This allows for precise control of the crank angle at which a combustion event can occur. Ignition may occur in the second sub-chamber for example due to spark ignition or the addition of heat or pressure from the first sub-chamber upon unsealing of the first sub-chamber. In addition to or instead of compression ignition, the machine may use a high temperature ignition source such as but not limited to an electrical arc and/or glow plug, in either or both of the first and second sub-chambers. As shown in figures FIG. 11 to FIG. 17, the machine's rocking piston provides the ability to use one or more electrically conductive elements located at predetermined locations such that they interact with high-voltage elements in the stator causing an electrical arc. In the example shown, these electrically conductive elements are one or more conductor strips 1115 located on the pistons which interact based on proximity with, for example, two sets of dual high-voltage electrodes 1120 and 1135. As shown in FIG. 12 by dashed lines 1210 and 1215 which trace the profile of the inner rotor feet 1015 and stator sealing feature 1040 shown in FIG. 11 through FIG. 17 respectively, the inner rotor foot 1220 and outer stator 1020 shown in FIGS. 11-17 could be easily modified to have the geometry of the inner rotor 1005 and outer stator 1020 show in FIGS. 1-10. Electrically conductive strips 1115 are also shown for reference.

Timing can be advanced by increasing the electrical potential to the electrodes. Spark ignition can be used as a backup if HCCI fails under certain conditions, such as cold starting or non-ideal fuel mixtures. Spark ignition can also be used to initiate pressure-induced combustion by igniting the fuel and thereby increasing chamber pressure before auto-ignition pressures would be reached purely by compression. In the embodiment shown in FIG. 11 through FIG. 17, multiple conductor strip inserts 1115 allow for variable voltage to advance the spark timing by up to 15 degrees before the first sub-chamber minimum volume crank angle.

As shown in FIG. 13 to FIG. 17, changing the crank angle changes the distance, shown by line 1125, between the electrodes and the array of conductive strip inserts 1115. Consequently, varying the voltage of the electrodes would change the minimum gap distance required between the electrodes 1120 and the nearest strip from the array of conductive strip inserts 1115 to consistently furnish an electrical arc.

Figure 14:
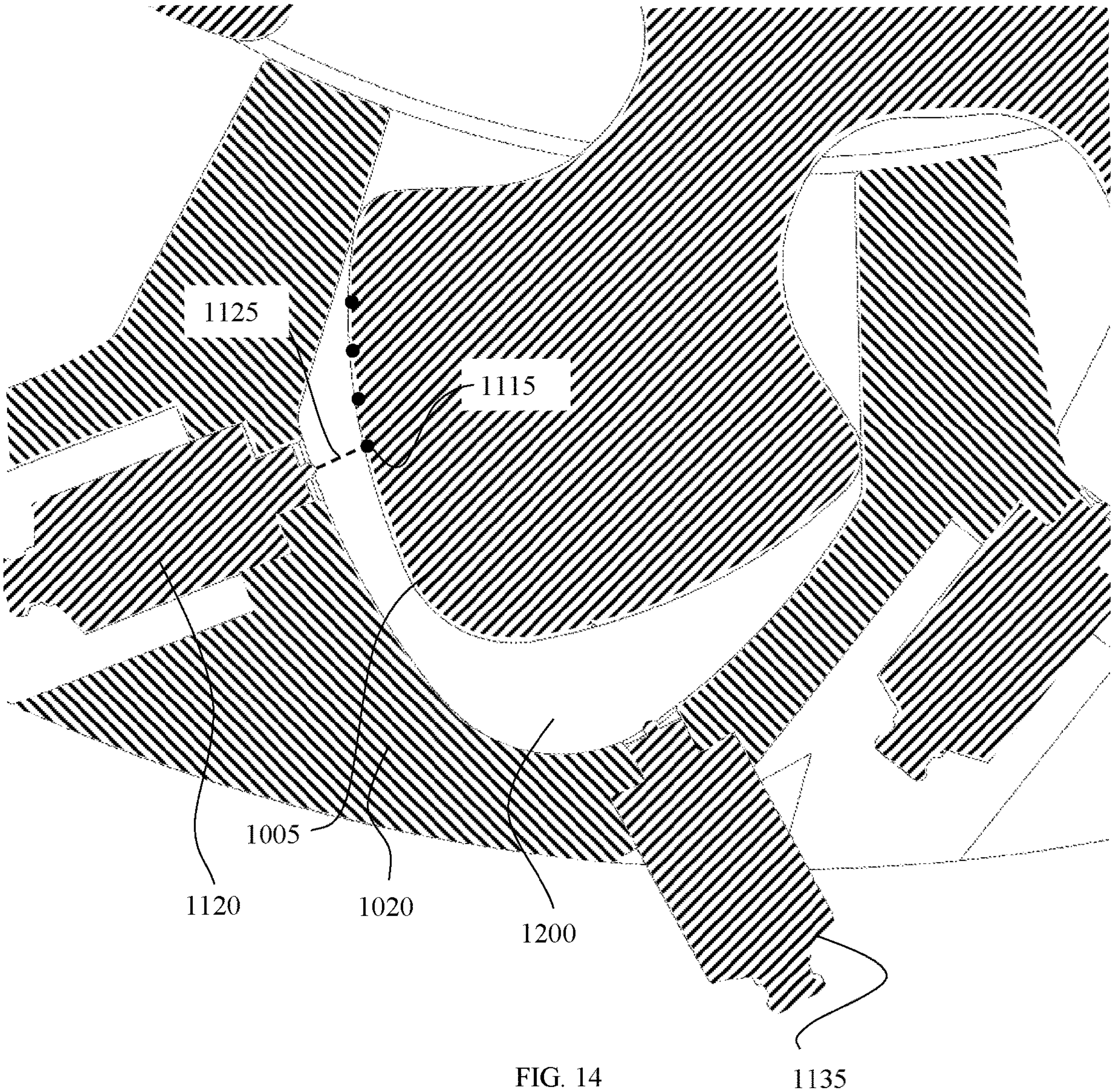
FIG. 14 is a closeup cross-section view of a cylinder and piston of the engine of FIGS. 11-13, at a crank angle advanced relative to the crank angle shown in FIG. 13.
Figure 15:
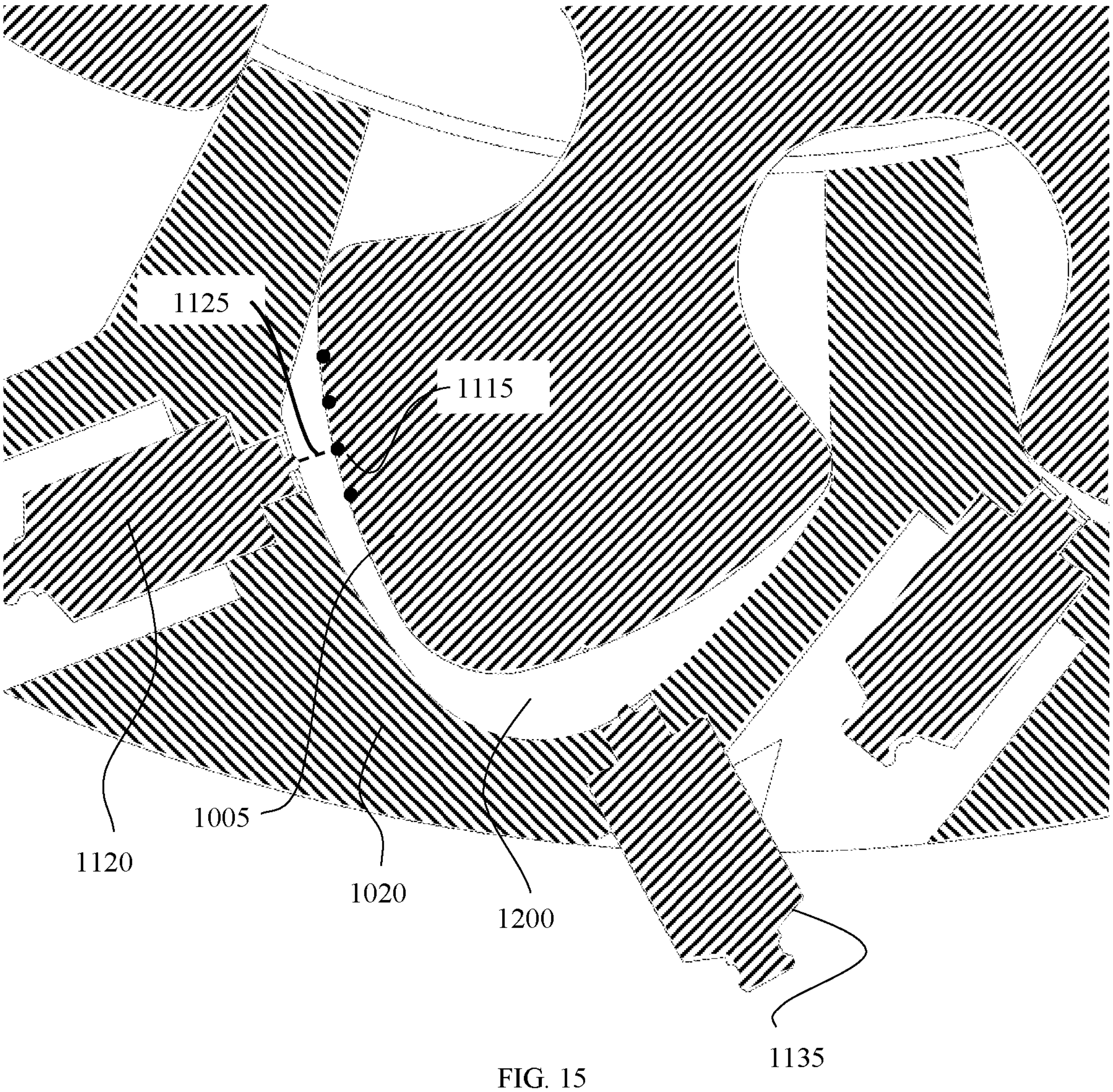
FIG. 15 is a closeup cross-section view of a cylinder and piston of the engine of FIGS. 11-14, at a crank angle advanced relative to the crank angle shown in FIG. 14.
Figure 16:
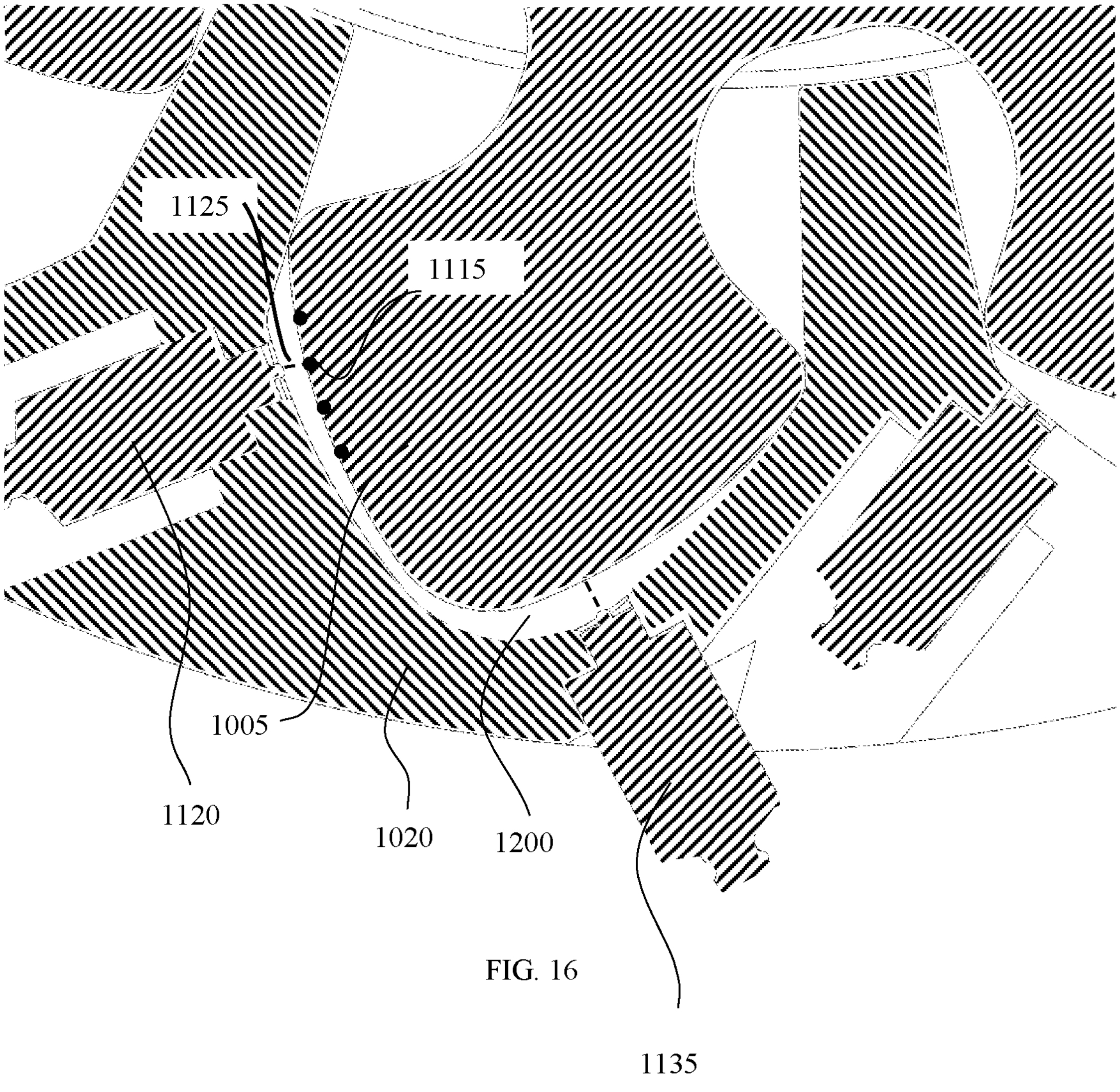
FIG. 16 is a closeup cross-section view of a cylinder and piston of the engine of FIGS. 11-15, at a crank angle advanced relative to the crank angle shown in FIG. 15.
Figure 17:
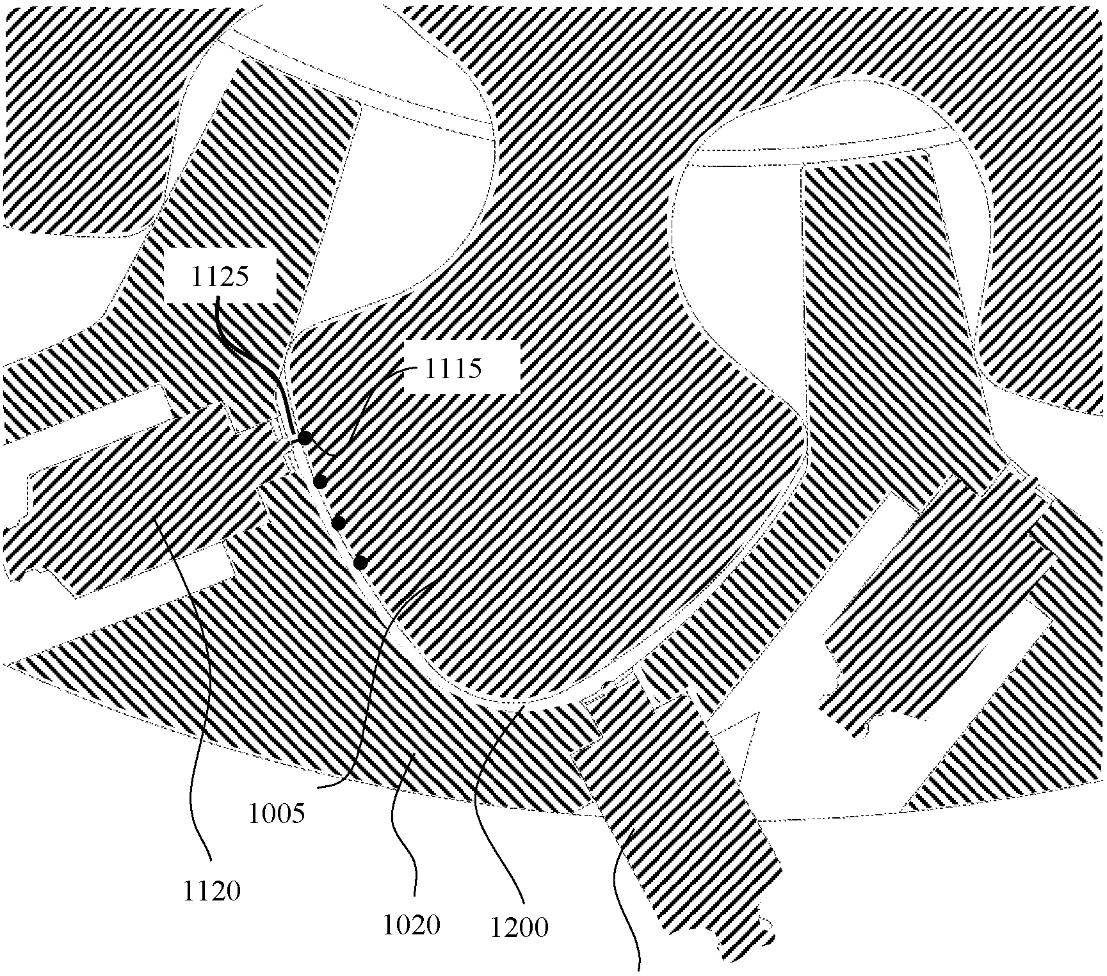
FIG. 17 is a closeup cross-section view of a cylinder and piston of the engine of FIGS. 11-16, at a crank angle advanced relative to the crank angle shown in FIG. 15.

In the non-limiting example shown in FIG. 14, the distance between the end of an electrode 1120 and the nearest strip of the array of conductive strip inserts 1115, this distance shown by the imaginary line showing the length of the electrical arc 1125, is greater than the corresponding distance between the electrode array 1120 and the array of conductive inserts 1115 shown in FIG. 15, the distance shown by line 1125, when the crank angle is closer to the chamber 1200 minimum volume crank angle and the compression ratio has increased. Similarly, at the crank angle shown in FIG. 15, the distance, shown by line 1125, between the end of electrode 1120 and the nearest strip of the array of conductive strips 1115 is greater than the distance between the electrode 1120 and the nearest strip of the array of conductive strips 1115 at the crank angle shown in FIG. 16. At the crank angle shown in FIG. 16, the distance, shown by line 1125, between the end of electrode 1120 and the nearest strip of the array of conductive strips 1115 is greater than the distance between the electrode 1120 and the nearest strip of the array of conductive strips 1115 at the crank angle shown in FIG. 17. This is important because it allows the spark timing to be controlled by increasing or decreasing the voltage potential to the electrodes. For clarity, it is possible to use a conventional spark plug to initiate combustion with this engine. It is also possible to initiate combustion through only the compression of the gasses. The proximity spark ignition construction and method disclosed here is intended to simplify the spark timing and ignition system requirements. The electrically conductive strips 1115 may be arranged, for example, as an array of a plurality of electrically conductive inserts which run all of or a portion of the way from one axial end to the other axial end of each inner rotor 1005 outward projection foot 1015. The strips may be oriented parallel to the axis of the inner rotor, or may be otherwise oriented to run from one axial end to the other axial end of each inner rotor 1005 outward projection foot 1015.

Alternatively, the conductive strips 1115 could comprise a single continuous strip spanning across the outer perimeter of the inner rotor projection.

The strips could be arranged in any way that allows two electrodes in a cylinder wall to achieve a desired gap distance between each of the electrodes and a portion of the conductive strip or strips at a predetermined crank angle. For example, if the electrodes 1120 are oriented as shown in FIG. 11, the conductive strips could be arranged in a single continuous strip, for example oriented in a square wave, sawtooth wave, or zig-zag shape. The one or more high-voltage elements in the stator (electrodes) may thus be two or more high voltage elements at different voltages, the electrical arc connecting the two or more high voltage elements in the stator via the one or more electrically conductive elements of the inner rotor.

In a non-limiting embodiment, the inner rotor, or the conductive strips on the inner rotor, is/are electrically grounded or otherwise maintained at a different potential from the electrode(s) so that a single electrode may be used in combination with the conductive strips on the projections of an inner rotor, rather than a pair of electrodes. Grounding, in this disclosure need not refer to the act of connecting a point on a circuit with the physical earth, but rather may refer to the act of connecting a point on a circuit back to a common reference point from which voltages may be measured. In this non-limiting embodiment, the inner rotor or electrical strip may be connected to the ground point using methods known to those of ordinary skill in the art, including conductive paths through ball bearings or other rolling metal components or brushes. With either of the single-electrode or multiple electrode embodiments, instead of conductive strips, a single conductive element substantially forming the inner rotor could alternatively be used. In a non-limiting embodiment, an internal combustion machine described in this disclosure is operated with hydrogen as the fuel source.

A typical spark ignition hydrogen-burning internal combustion engine may experience high NOx emissions as a result of high combustion temperatures. HCCI operation may result in significantly lower NOx emissions than traditional spark ignition, because HCCI combustion is can be used with leaner air-fuel ratios, which can result in lower combustion temperatures and thus reduced NOx production.

When the hydrogen is mixed with air in the internal combustion engine and burned, water vapor is formed as a by-product and is present in the resulting exhaust flow of the machine.

In a non-limiting embodiment, the water resulting from combustion is separated from the exhaust, for example via by condensation, and collected in a reservoir. This collected water may be introduced into the combustion chamber, for example via an atomizer sprayer fed by a water injection pump within the intake system, or by injecting the water directly into the chamber, in order to cool the intake air charge and/or to reduce the maximum temperature of the combusted gas. In the non-limiting exemplary schematic shown in FIG. 19, a water separator 1155 is connected to the exhaust flow of machine 2100, the connection shown schematically via dashed line 1165. Water separated out by the water separator 1155 travels to reservoir 1150, the connection shown schematically via line 1170. Water is pumped from the reservoir 1150 to the machine 2100 via pump 1160, the connection between the reservoir and the pump 1160 shown schematically via line 1175 and the path between the pump and the machine 2100 shown schematically via line 1180. An engine management CPU 1185 controls the pump to inject the desired amount of water at the desired timing. Introducing water into the combustion chamber may have the added benefit of cooling engine components. In a non-limiting embodiment, the collected water is injected into the cylinder before or during the expansion cycle. In a non-limiting embodiment, a machine has a piston and a cylinder. The piston is arranged to enter the cylinder and seal against the cylinder to form a primary chamber, and to exit the cylinder to unseal the primary chamber. The primary chamber has a first sub-chamber at a first side of the primary chamber and a second sub-chamber at an opposing side of the primary chamber. The piston is arranged to change an angle of alignment relative to the cylinder as the piston enters and exits the cylinder. The angle change of the piston results in a rocking motion which first seals and then unseals the first sub-chamber from the second sub-chamber between the forming and unsealing of the primary chamber. The description of this paragraph applies to for example the embodiment of FIG. 1 and may combined with other features disclosed in this document. The terms “first side” and “second side” may be used to refer to any two parts of the primary chamber separated by a seal. In the examples shown, they are at different circumferential locations within the chamber, but in other embodiments may have different spatial relationships.

Methods of Operating the Machine

Figure 20:
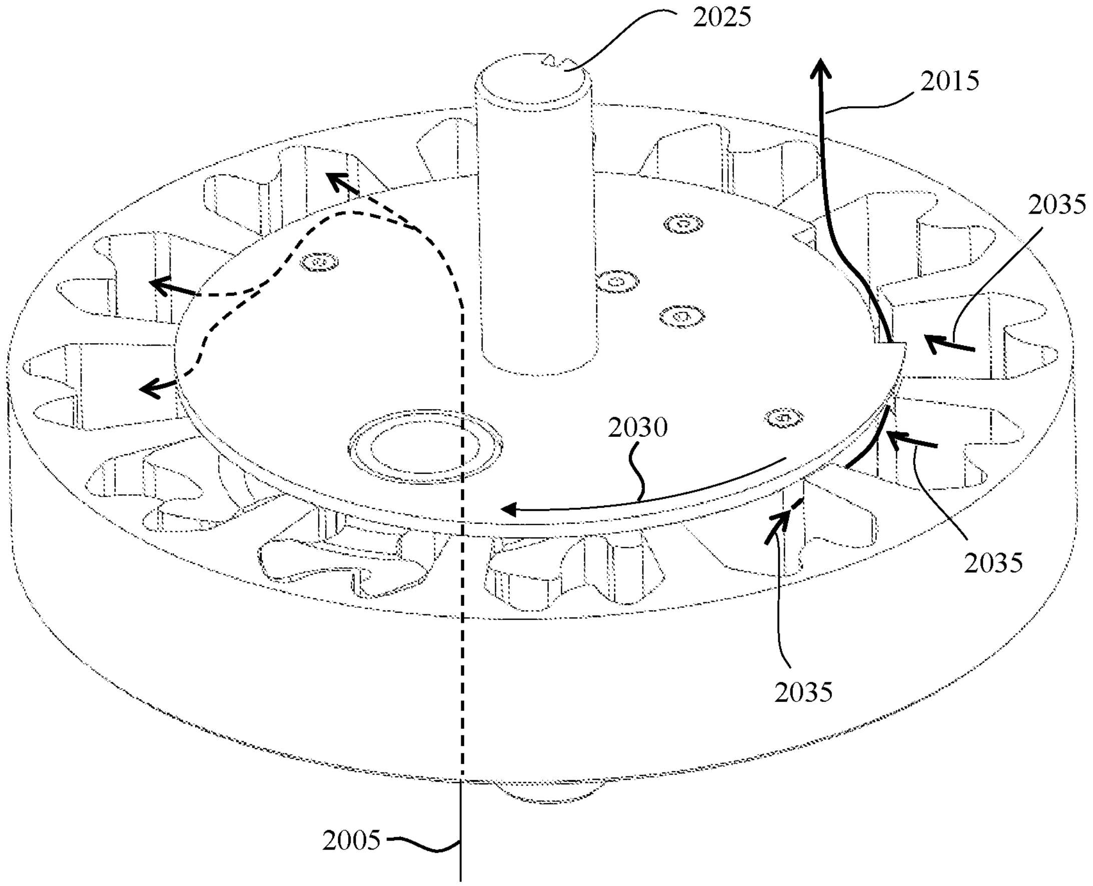
FIG. 20 is an isometric cutaway view of an engine as shown in FIGS. 1-10 showing an axial plate of a carrier of the engine.

In a non-limiting embodiment, an energy transfer machine having geometry such as shown in FIG. 1 begins a combustion cycle in a stator inward-facing cavity, also called a chamber 1100, at as the crank angle shown in FIG. 1. At this crank angle, a first chamber 1100 is already filled with air. At the crank angle shown in FIG. 1, a second chamber 1900 has unsealed from an inner rotor projection, allowing it to begin an intake phase and become filled primarily with air. Thus, each successive chamber between second chamber 1900 and first chamber 1100 (referred to in the counter-clockwise direction) has had time to intake air, with chamber 1100 having the greatest amount of time to intake air. An intake air channel is on the far side of the carrier 1010, in this view, and is indicated by a dashed line 1905. Dashed line 1905 shows the border of an intake air channel 2010, shown in FIG. 21 and FIG. 24, located on the far side of the crescent 1910 in this figure. Airflow from the intake side of the engine is permitted through intake air channels 2010, shown in FIG. 21, located in the crescent 1910, which is attached to the carrier 1010, and into the chambers. The path of intake airflow is shown by arrows 1915 in FIG. 1. In a non-limiting embodiment shown in FIG. 21, the path of intake airflow, shown by arrow 2005, enters the crescent from a first axial end of the carrier 1010 and flows through intake air channel 2010 which runs around the outer diameter of the crescent 1910. The intake air then enters the unsealed chambers radially as shown by arrows 1915 in FIG. 1. In a similar manner, in a non-limiting embodiment, exhaust gasses exit unsealed chambers radially and enter the exhaust channel 2020 which runs around the outer diameter of the crescent 1910, the exhaust gasses then exit the carrier 1010 from a second axial end of the carrier 1010. FIG. 20 shows the respective paths of intake air and exhaust gas with the outer rotor installed for reference. Arrow 2030 in FIG. 20 shows the direction of rotation of the carrier 1010. FIG. 24 shows an isometric view of the crescent intake channel 2010 and crescent exhaust channel 2020 with the path of intake air 2005, path of exhaust flow 2015, stator and stator cavity shown for reference. Arrows 2035 in FIG. 20 show exhaust flow out of the stator cavities. At the crank angle shown in FIG. 1, the intake cycle has begun for chamber 1900. As shown in FIG. 4 the sealed volume 1110 within primary chamber 1070 is not sealed against the crescent 1910 at the crank angle shown in FIG. 4 at which point primary chamber 1070 seals from the intake airflow.

Figure 22:
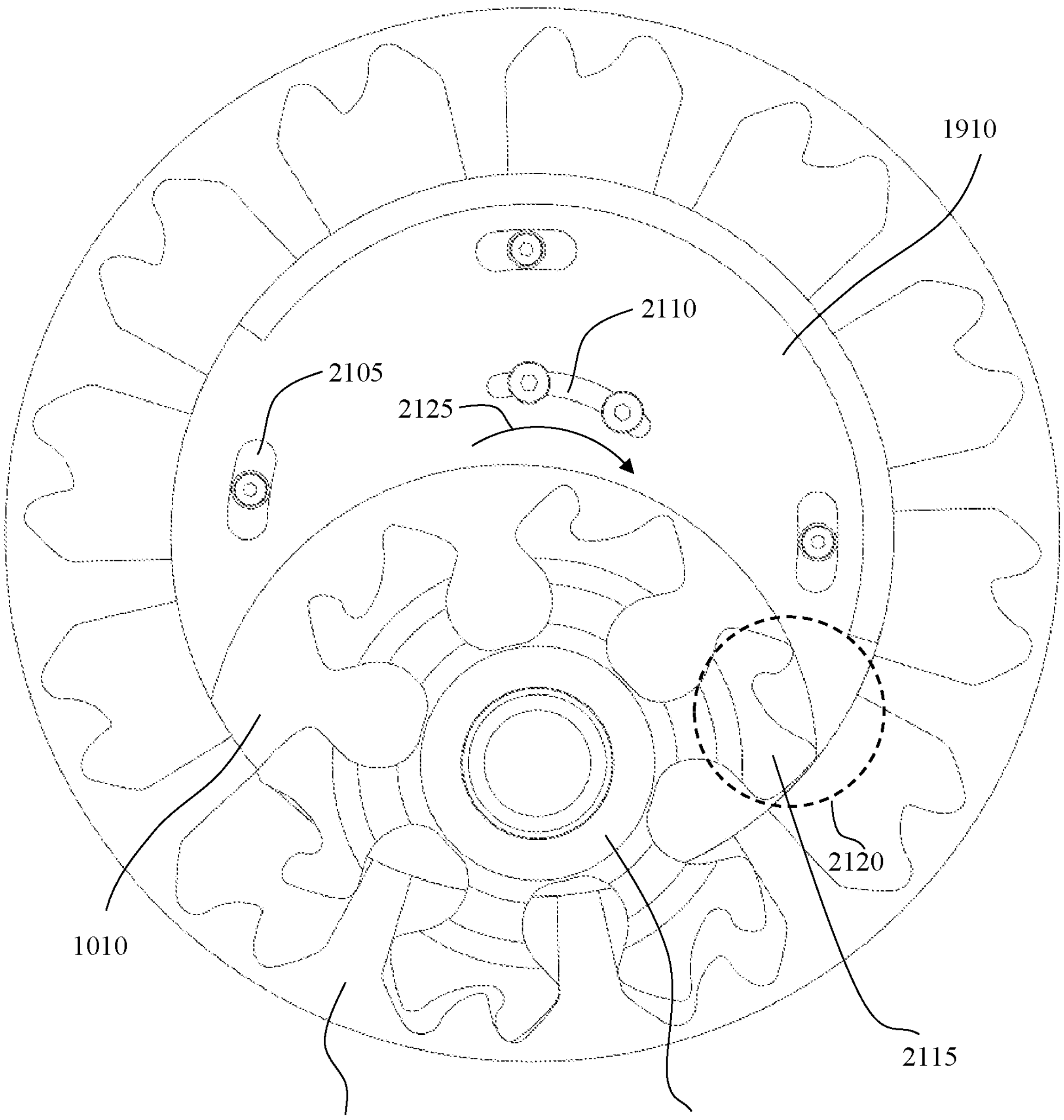
FIG. 22 is an axial cutaway view of the engine of FIGS. 20-21.
Figure 23:
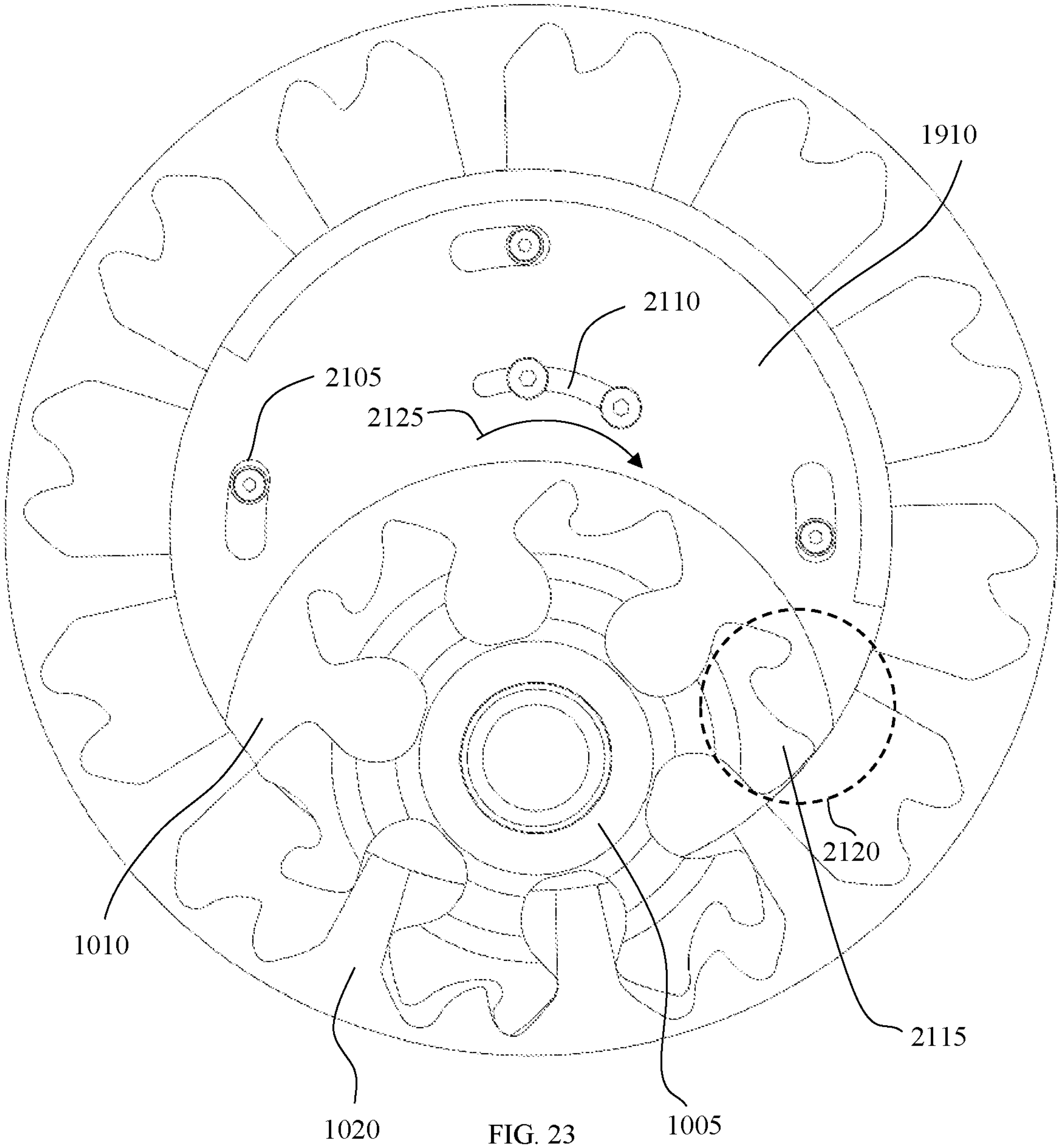
FIG. 23 is an axial cutaway view of the engine of FIGS. 22, with the crescent differently positioned than in FIG. 22 relative to the axial plate of the carrier and to the inner rotor to show exaggerated tolerances between the inner rotor and a crescent of the engine.

In the non-limiting embodiment shown in FIG. 22, the crescent 1910 located on carrier 1010 may be adjustable, relative to the carrier, via rotation and/or position to vary the amount of clearance between the radial ends of the inner rotor feet and the inner diameter of the crescent 1910 and/or the OD of the crescent and the ID of the carrier. As shown in FIG. 22, first slot 2105 array and second slot 2110 allow the rotational position of crescent 1910 to be adjusted by rotating crescent 1910 about the axis of the carrier 1010. The inventor contemplates that other methods may be used to adjust the rotation and position of the crescent in this manner. As shown in FIG. 22, the crescent has been adjusted so that the radial ends of the inner rotor feet 2115 seal against the leading edge of the crescent 1910 in the crescent leading edge sealing region 2120. FIG. 23 shows an exaggerated adjustment location of the crescent 1910 with an undesirably large gap shown in region 2120 where the inner rotor feet exit the cavities of the outer rotor, between the crescent 1910 leading edge sealing region and the radial ends of the inner rotor feet 2115. Arrow 2125 shows the direction of rotation of the carrier 1010.

For the following combustion cycle description, we will refer to time passed in milliseconds starting at a reference time of 0.0 milliseconds at the crank angle shown in FIG. 1 with the machine carrier rotating clockwise at 5,000 RPM. The use of time increments is for clarity of description and it is understood that the time increments will be different at different speeds and engine configurations.

Figure 2:
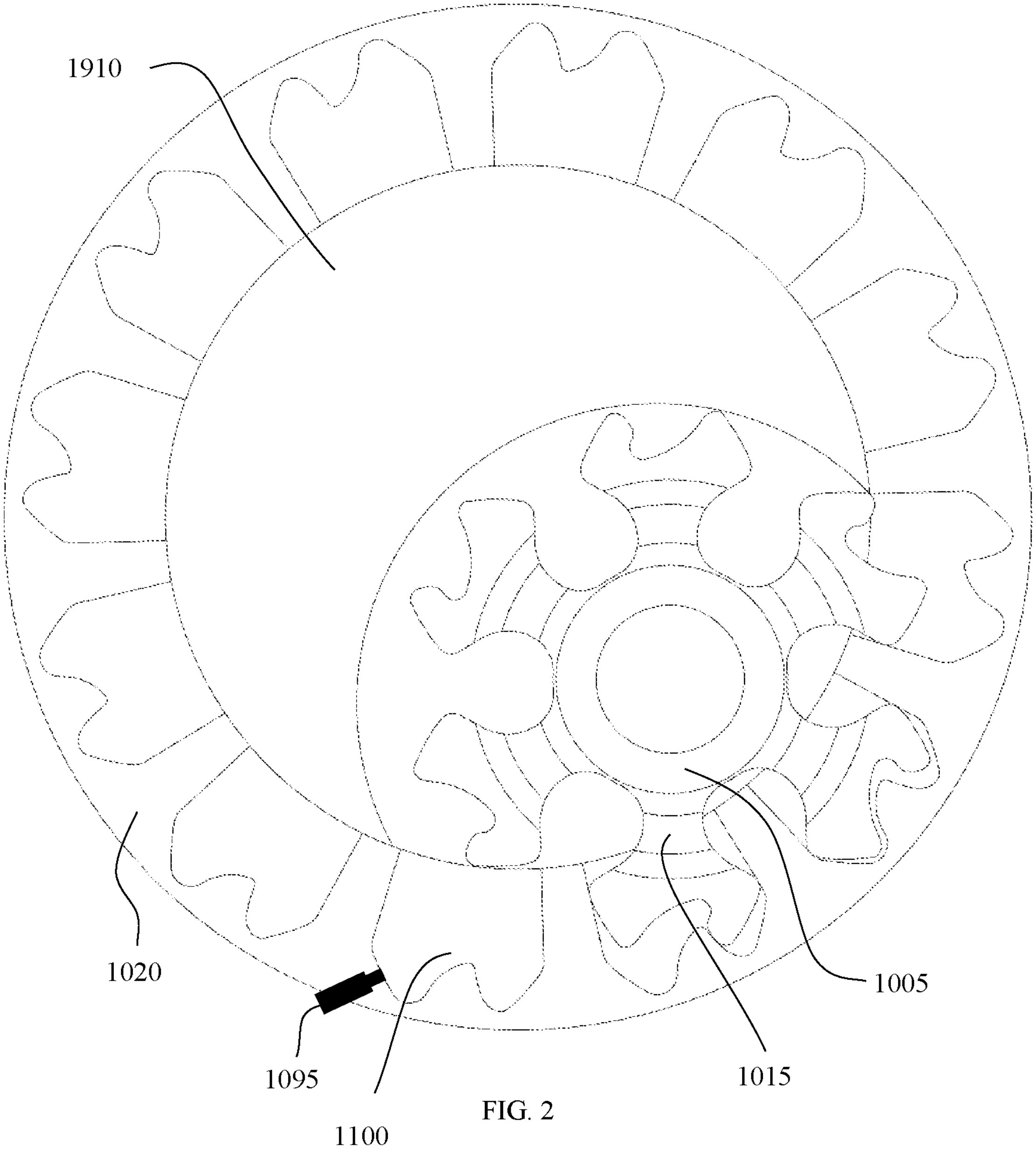
FIG. 2. is an axial cutaway view of the exemplary energy transfer machine at a crank angle advanced relative to FIG. 1.
Figure 3:
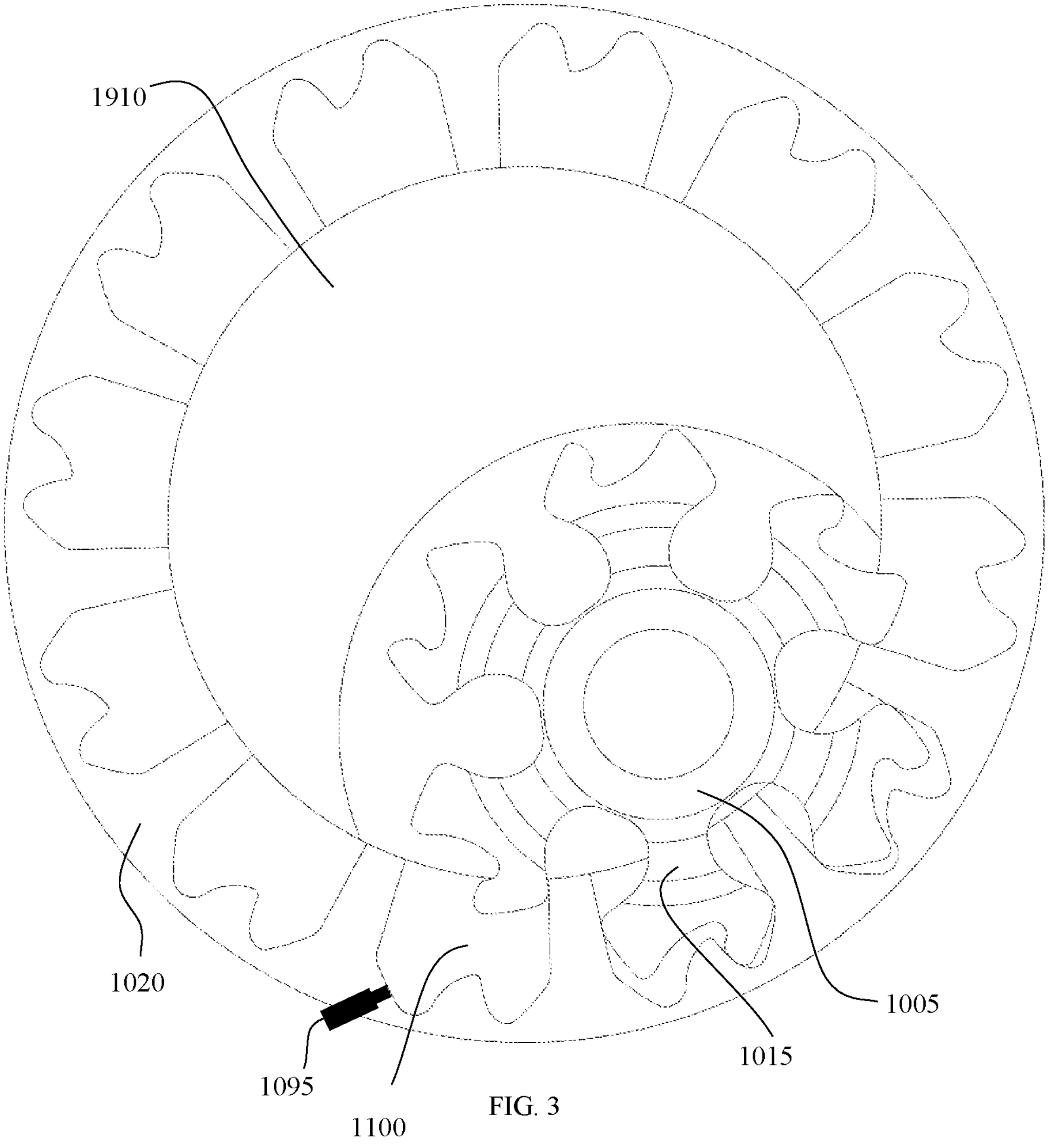
FIG. 3 is an axial cutaway view of the exemplary energy transfer machine at a crank angle advanced relative to FIG. 2.

The chamber 1100 is injected with fuel such as but not limited to gasoline, diesel, hydrogen gas, natural gas, biogas, or some combination or mixture thereof, starting at a crank angle before it is sealed to form the primary chamber, such as at the position shown in FIG. 2 which is at a crank angle at about the time 0.2 milliseconds from the reference point of FIG. 1, or FIG. 3 which is at the time 0.4 milliseconds from reference. Fuel injection may be delayed depending on operating conditions. For example, if the engine is operating at a lower rotation speed, the injected fuel would have more time to fill the chamber. Starting fuel injection earlier provides more time for the air and fuel to mix thoroughly. The timing of injection would ideally be timed to prevent dispersion of the fuel outside of the chamber before the chamber is sealed. Fuel injection could continue until past the point at which the primary chamber seals depending on operating conditions. However, this may require high pressure injectors once compression begins.

At the crank angle shown in FIG. 4, which is about 0.7 milliseconds from the reference time, the primary chamber 1070 seals. Any further rotation would result in compression of the gas in sealed volume 1110, the aforementioned sealed volume showed by dashed lines in the primary chamber 1070.

As the machine's crank angle progresses from the position shown in FIG. 4 to the position in FIG. 5, compression occurs and the air-fuel mixture may become more homogenously mixed as the fuel becomes more uniformly dispersed.

At the crank angle shown in FIG. 5, which is about 1.0 milliseconds from the reference time, the first sub-chamber 1060 and second sub-chamber 1065 seal from each other. In the non-limiting device shown in FIG. 5, at the point of the first sub-chamber sealing crank angle the primary chamber is compressed to slightly less than half of its initial volume. In this non-limiting example, the primary chamber would therefore be at approximately 2.6 times its initial pressure, when neglecting effects of heat transfer or leakage. This geometric compression ratio is therefore suitable for use with a wide range of fuels, because the induced increase in pressure is not likely to induce autoignition of many conventional fuels, such as but not limited to gasoline, diesel, propane, or hydrogen. Other geometric compression ratios, which do not result in a pressure or temperature increase sufficient to induce autoignition of the air/fuel mixture, may also be chosen for this first stage of compression. At this first sub-chamber sealing crank angle, the first sub-chamber 1060 is also at a pressure ratio of roughly 2.6:1 as compared to the point when the primary chamber sealed.

Figure 6:
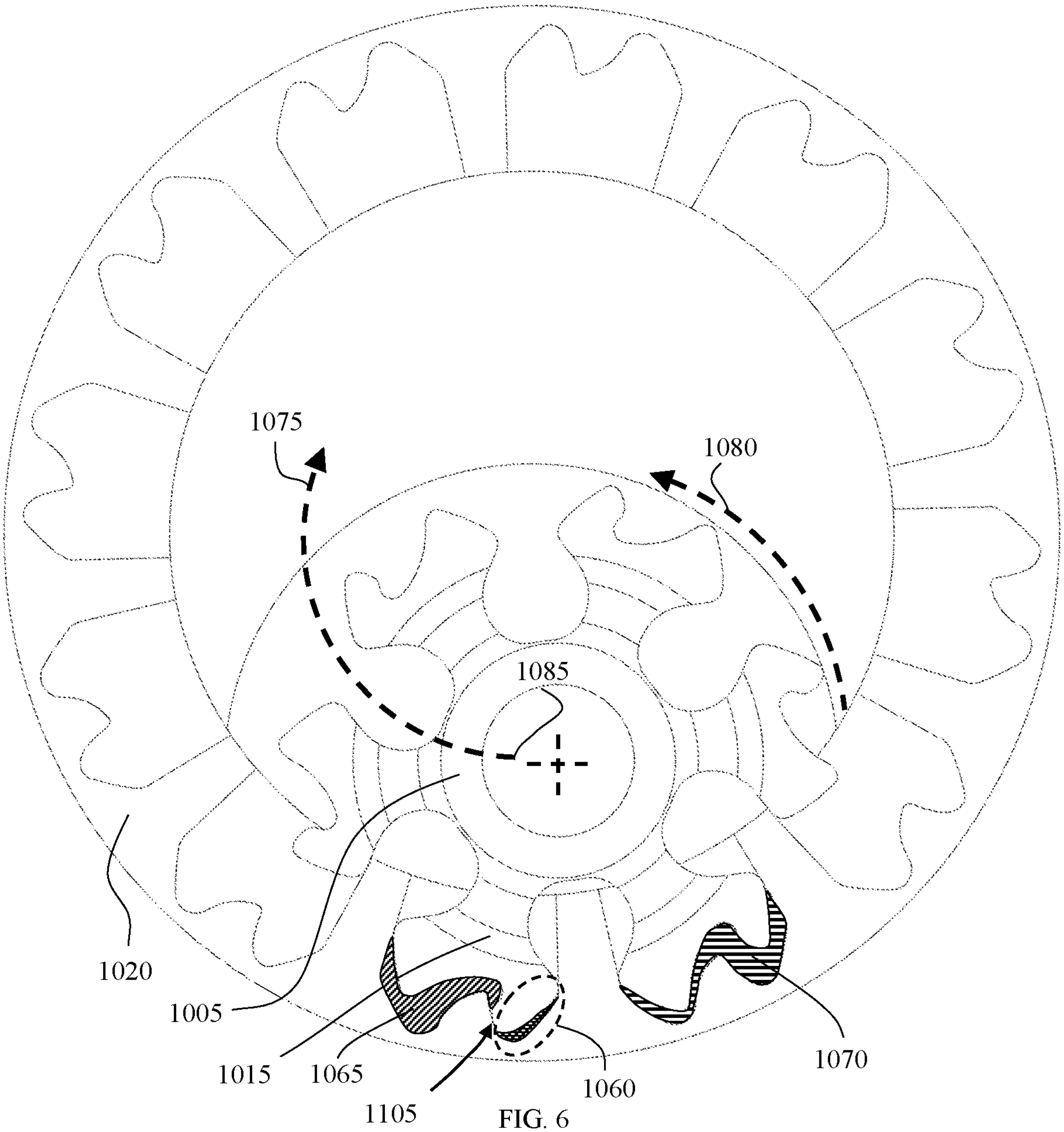
FIG. 6 is an axial cutaway view of the exemplary energy transfer machine at a crank angle advanced relative to FIG. 5.

Between the crank angle shown in FIG. 5 and the crank angle shown in FIG. 6, the first sub-chamber 1060 undergoes compression at a faster rate than the second sub-chamber 1065. Consequently, the first sub-chamber 1060 achieves a higher maximum compression ratio at its minimum volume, than does the second sub-chamber 1065 at that crank angle.

The carrier 1010 of the machine shown in FIG. 6 is rotated such that the volume of the first sub-chamber 1060 is approaching its minimum sealed volume. The first sub-chamber 1060 would reach its minimum volume at about 1.5 milliseconds from reference time. This position is called the first sub-chamber minimum volume. In this position, the first sub-chamber 1060 has undergone about a 15:1 further reduction in volume compared to when it was at the first sub-chamber sealing crank angle shown in FIG. 5, which occurred when the primary chamber 1070 was at a 2:1 geometric compression ratio, resulting in a total geometric compression ratio of about 30:1 in this exemplary embodiment. Such a geometric compression ratio is likely suitable for purposes of inducing compression ignition of a range of conventional fuels. The machine could, alternatively, have a lower or higher compression ratio, for example as needed for compression ignition of a given fuel type and air mixture. In an example, the compression ratio may be above the ratio generally required for compression ignition of hydrogen.

At the crank angle shown in FIG. 7A which would occur about 2 milliseconds after the reference time, the first sub-chamber has passed its minimum sealed volume and has unsealed from the second sub-chamber. At the crank angle shown in FIG. 7A, the first sub-chamber 1060 has unsealed from the second sub-chamber 1065. A close up of the primary chamber 1070 at the crank angle shown in FIG. 7A is shown in FIG. 7B, showing what was previously the first and second sub-chambers, and is now the primary chamber 1070 because there is no seal between the first and second sub-chambers. Before the first sub-chamber sealing crank angle, the first and second sub-chambers are connected and comprise the primary chamber and are both at a geometric compression ratio of 2:1. After the first sub chamber sealing time, the first sub-chamber is compressed by an additional 15:1 ratio while the second sub-chamber only undergoes an additional 8:1 compression for a total geometric compression ratio of 30:1 for the first sub-chamber and 16:1 for the second sub-chamber just before the first sub-chamber unseals. For reference, in FIG. 7A chamber 1071 is adjacent to primary chamber 1070 and is undergoing an expansion stroke.

As a result, the air-fuel mixture in the first sub-chamber 1060 can be ignited as a result of compression pressure, whereas the air-fuel mixture in the second sub-chamber 1065 would not ignite. Because, in this embodiment, the first sub-chamber achieves a maximum compression ratio which is higher than that generally needed for compression ignition of hydrogen fuel, ignition would likely occur at some intermediate crank angle between the crank angle shown in FIG. 5 and the crank angle shown in FIG. 6. Consequently, at the crank angle shown in FIG. 6, the first sub-chamber 1060 is highly pressurized as a result of ignition of the air-fuel mixture.

Figure 18A:
FIG. 18A (PRIOR ART)
FIG. 18A is a graph of torque with respect to crank angle for a conventional piston engine operating with a four stroke cycle and six cylinders.
Figure 18B:
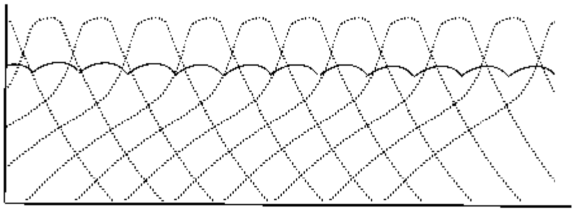
FIG. 18B is a graph of torque with respect to crank angle for the energy transfer machine of FIGS. 1-9 operated as an engine.

As the machine rotates from the crank angle shown in FIG. 6 to the crank angle shown in FIG. 7A, which occurs at about time 2 milliseconds from the reference time, the first sub-chamber 1060 unseals from the second sub-chamber 1065, resulting in a pressure wave propagating from the first sub-chamber 1060 to the second sub-chamber 1065. After the first sub-chamber unsealing time, the increase in pressure and propagation of high-temperature combusted or combusting air-fuel mixture from the first sub-chamber, causes the air-fuel mixture in the second sub-chamber to ignite. The resulting pressure wave from the first sub-chamber propagates over approximately the next 0.5 milliseconds after the unsealing of the first sub-chamber. This time may be greater or lesser and is only included here to aid in describing the general effect. At the crank position shown in FIG. 8, the machine has started the expansion phase of the cycle for this primary chamber. This expansion imparts a torque to the carrier, which, in turn, powers the compression of the volume in the first sub-chamber of the adjacent chamber 1145. The aforementioned adjacent chamber's first sub-chamber 1145 will achieve compression ignition about 2.5 milliseconds from the reference time, which is about 1.0 milliseconds after the previous ignition event which occurred in the first sub-chamber 1060. Consequently, at a carrier output speed of 5,000 RPM, the energy transfer machine would undergo 1,000 combustion events each second, resulting in smooth torque output. By comparison, a conventional piston engine operating at 5,000 RPM with a four stroke cycle and six cylinders would only undergo 250 combustion events each second, and may yield a torque that is temporarily negative for portions of its operation as shown in FIG. 18A, the energy transfer machine disclosed here has a two-stroke cycle and 12 combustion cycles per revolution and yields a smooth torque output as shown by FIG. 18B. In FIG. 18A and FIG. 18B, the X-axis shows the crank angle and the Y-axis shows torque.

As the machine rotates from the crank angle shown in FIG. 8 to the crank angle shown in FIG. 9, the primary chamber 1070 undergoes an expansion phase. As shown in FIG. 9, this expansion is should be complete at about 3.4 milliseconds after the reference time. In this non-limiting exemplary embodiment, the primary chamber 1070 has a maximum expansion volume 1110 may be larger than the initial volume shown at the end of the intake cycle which ends when the primary chamber unseals against the inner rotor 1005 at the crank angle shown in FIG. 4. This results in in the potential for increased efficiency. As shown in FIG. 9, each outward-facing projection of the inner rotor may have a respective first portion, here inner rotor sub-chamber sealing feature 1045, and a second portion, here inner rotor second projection 1050. The carrier in this embodiment comprises a crescent 1910 which seals against the respective first portions of the outward-facing projections of the inner rotor as the outward-facing projections exit the inward-facing cavities of the outer stator to continue to form the primary chamber 1070 as the first portions of the outward-facing projections of the inner rotor exit the inward-facing cavities of the outer stator. The first portions may continue to seal against the crescent as they travel along it, or may soon unseal as shown in FIG. 9 and FIG. 22.

As the machine rotates past the crank angle shown in FIG. 9, the primary chamber 1070 unseals and undergoes an exhaust cycle as the second portions of the outward-facing projections of the inner rotor unseal from the inward-facing cavities. The machine then becomes ready to begin a new cycle.

Stratified combustion may traditionally refer to localized rich concentrations of fuel within a combustion chamber which are easier to ignite than the leaner concentration in the rest of the chamber. This allows for ease of ignition in the areas of the chamber containing a rich air-fuel mixture, while enabling lean burn in the rest of the chamber.

In the geometry disclosed by the inventor in FIG. 1 through FIG. 10, the primary chamber 1070 splits into a first sub-chamber 1060 and a second sub-chamber 1065. In a non-limiting embodiment shown in FIG. 25, which may otherwise correspond to the embodiment shown in FIG. the second sub-chamber 1065 is supplied fuel by a first fuel injector 1095 and the first sub-chamber 1060 is supplied by a second fuel injector 1140 which allows for discrete and compartmentalized control of the air-fuel ratio in the first sub-chamber 1060 and the second sub-chamber 1065. Such a construction may allow a designer to control the fuel/air ratios of each chamber independently to achieve stratified charge combustion and benefits thereof described in the preceding paragraph.

In a non-limiting embodiment, fuel is injected into the primary chamber 1070 after the primary chamber 1070 is sealed. This would have the potential to allow for higher power density than if fuel were injected before sealing of the chamber, because the injected fuel would not displace intake air. This may be particularly advantageous when used with fuels of low volumetric density and fuels which require richer air-fuel ratios, such as, but not limited to, hydrogen.

Figure 25:
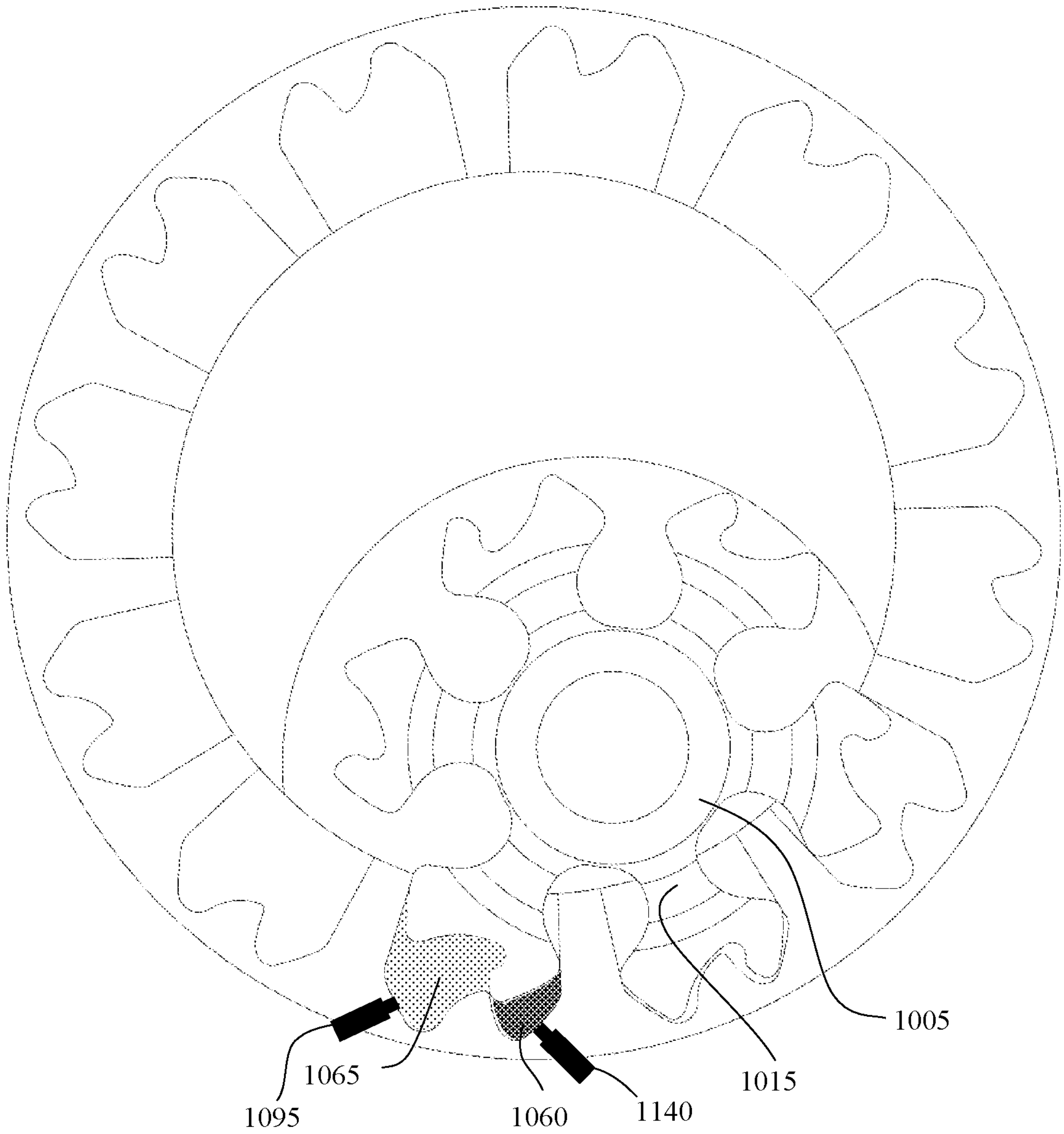
FIG. 25 is an axial cutaway view of the engine of FIGS. 1-10 or FIGS. 20-21 or FIG. 24, showing fuel injectors in subchambers of the engine.

In a non-limiting embodiment, fuel such as but not limited to hydrogen gas, gasoline, or diesel is injected into both a first sub-chamber 1060 and a second sub-chamber 1065, after the sub-chambers are sealed from each other, such as at the point shown in FIG. 25, with the first sub-chamber experiencing a relatively rich air-fuel concentration and the second sub-chamber experiencing a relatively leaner concentration.

In a non-limiting embodiment, a control scheme selects a predetermined total mass of fuel desired for combustion. If the fuel mass is insufficient for stoichiometric combustion within both of the sub-chambers, but greater than the amount required for stoichiometric combustion in the first sub-chamber, the first sub-chamber is injected with up to or close to the amount of fuel required for stoichiometric combustion, with the remainder of the fuel injected into the second sub-chamber. Alternatively, the first sub-chamber may be filled with an amount of fuel that is leaner than that required to achieve a stoichiometric ratio, but is rich enough to be ignited by the compression of the first sub-chamber at the desired point. This optimizes ease of ignition, while still allowing for lean-burn.

If less power is required and or greater efficiency is desired, less fuel than the amount required for stoichiometric combustion may be injected into the second sub-chamber. For example, the designer may define a number of variables which determine the minimum amount of fuel required for viable lean-burn when ignited by the first sub-chamber. This quantity of fuel may be injected into the second sub-chamber during the compression stroke with the remainder of the fuel injected into the first sub-chamber.

In a non-limiting embodiment, all of the fuel is injected into the first sub-chamber 1060 when the primary chamber 1070 is sealed and the seal between the first sub-chamber 1060 and second sub-chamber 1065 are sealed. This could allow for combustion within the first sub-chamber 1060 and an expansion volume within the primary chamber 1070 after the first sub-chamber unsealing time which is much larger than the first sub-chamber compression volume.

Figure 26:
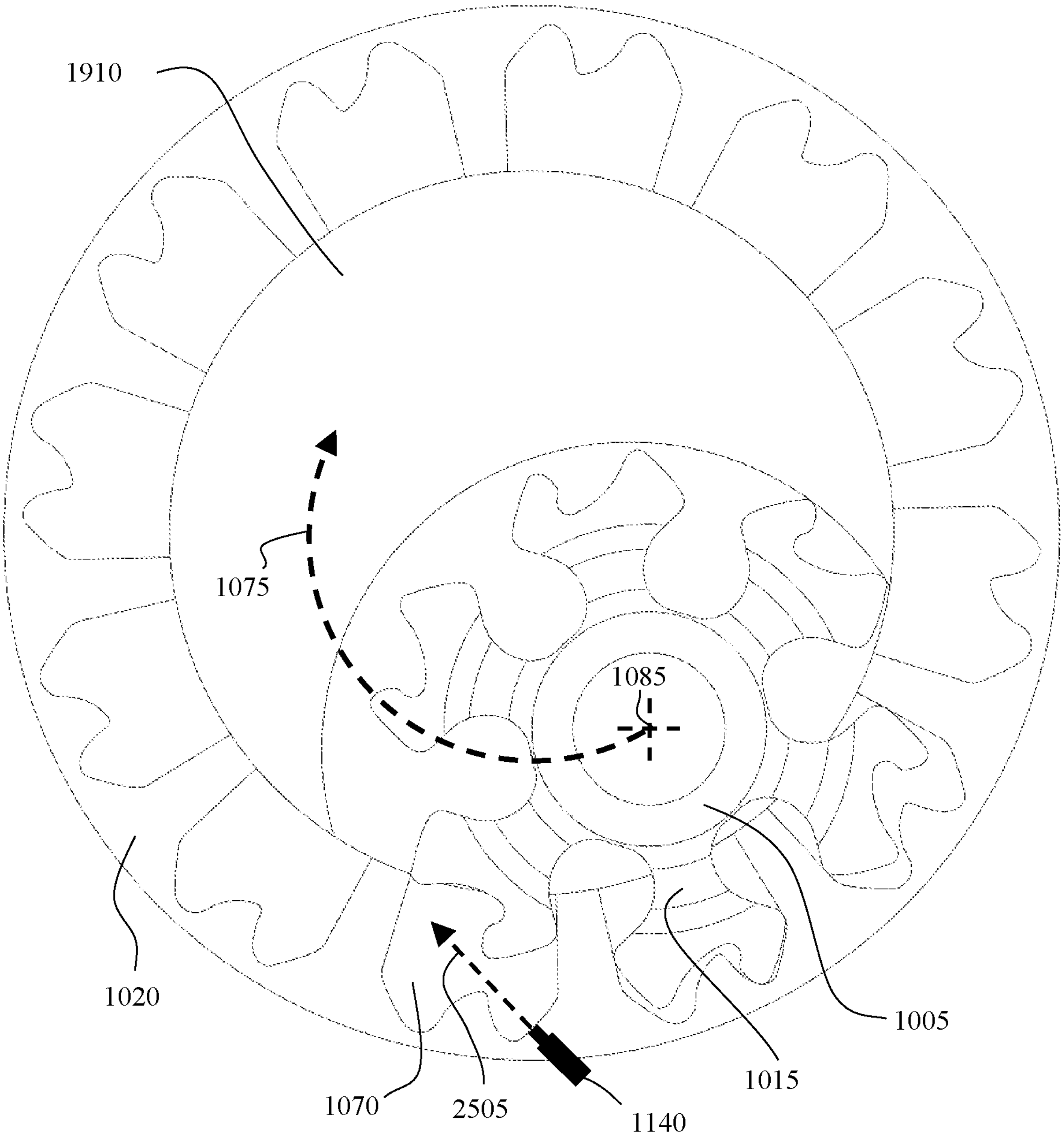
FIG. 26 is an axial cutaway view of the engine of FIGS. 1-10 or FIGS. 20-21 or FIG. 24, showing a fuel injector in one subchamber of the engine supplying fuel to another subchamber.

In the non-limiting embodiment shown in FIG. 26, fuel is supplied to primary chamber 1070 via an injector 1140 which is located in the first sub-chamber region. In an embodiment, fuel is injected at a crank angle before the first sub-chamber sealing crank angle and is timed so that the first sub-chamber achieves a richer air-fuel mixture at the first sub-chamber sealing crank angle. Arrow 2505 demonstrates the direction of fuel propagation from the fuel injector 1140 in the first sub-chamber 1060 region of the primary chamber 1070 to the second sub-chamber region of the primary chamber 1070. In a non-limiting embodiment, fuel may be injected after the primary chamber 1070 seals from the carrier.

In a non-limiting embodiment, fuel is injected before the primary chamber 1070 seals and is timed to minimize or eliminate the occurrence of unburned fuel leaving the primary chamber before the primary chamber seals.

In a non-limiting embodiment, during a combustion cycle fuel is injected at least once before the first sub-chamber sealing crank angle and at least once after the first the first sub-chamber sealing crank angle.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The invention claimed is:

1. An engine comprising a piston and a cylinder, the piston arranged to enter the cylinder and seal against the cylinder to form a primary chamber, and to exit the cylinder to unseal the primary chamber;

the piston having one or more electrically conductive elements located at predetermined locations such that they interact with one or more high-voltage elements in the cylinder causing an electrical arc to occur between an electrically conductive element of the one or more electrically conductive elements and a high voltage element of the one or more high-voltage elements at a timing determined at least in part by when a motion of the piston within the cylinder brings the electrically conductive element into sufficient proximity with the high-voltage element to cause the electrical arc.

2. The engine of claim 1 in which the one or more high-voltage elements in the cylinder are two or more high-voltage elements at different voltages, the electrical arc connecting the two or more high-voltage elements in the cylinder via the one or more electrically conductive elements of the piston.

3. The engine of claim 1 in which the one or more high-voltage elements in the cylinder have a voltage different from a reference voltage of the one or more conductive elements of the piston, the electrical arc connecting the one or more high-voltage elements in the cylinder to the one or more electrically conductive elements of the piston.

4. The engine of claim 1 in which the one or more electrically conductive elements of the piston are a single element substantially forming the piston.

5. The engine of claim 1 in which the timing of the electrical arc relative to the motion of the piston within the cylinder is controllable by varying a voltage or different voltages supplied to the one or more high-voltage elements.

6. The engine of claim 5 in which the one or more electrically conductive elements of the piston are multiple electrically conductive elements, and the varying of the voltage supplied to the one or more high-voltage elements changes which of the multiple electrically conductive elements interacts with the one or more high-voltage elements in the cylinder to cause the electrical arc.

7. The engine of claim 1 in which the piston is arranged to change an angle of alignment relative to the cylinder as it enters and exits the cylinder.

8. The engine of claim 7 in which the piston is part of a rotor undergoing rotary motion relative to the cylinder.

* * * * *